(12) United States Patent
Nouis et al.

(10) Patent No.: US 6,346,056 B1
(45) Date of Patent: Feb. 12, 2002

(54) FLYWEIGHT SYSTEM

(76) Inventors: Randy Gene Nouis; Cynthia Lynn Nouis, both of 11524 Kings Coach Rd., Grand Blanc, MI (US) 48439

(*) Notice: Subject to any disclaimer, the term of this patent is extended or adjusted under 35 U.S.C. 154(b) by 0 days.

(21) Appl. No.: 09/410,905

(22) Filed: Oct. 2, 1999

(51) Int. Cl.⁷ .......................... F16H 59/00; F16H 61/00
(52) U.S. Cl. ............................................ 474/14
(58) Field of Search ........................ 474/14, 16, 11, 474/13, 43, 12, 46, 45, 8, 44, 69, 70; 192/105 C, 99 A

(56) References Cited

U.S. PATENT DOCUMENTS

| | | | | |
|---|---|---|---|---|
| 3,727,478 A | * | 4/1973 | Erickson et al. | 474/14 |
| 3,971,263 A | * | 7/1976 | Beaudoin et al. | 474/14 |
| 4,464,144 A | * | 8/1984 | Kobayashi | 474/14 |
| 4,826,467 A | * | 5/1989 | Reese et al. | 474/14 |

FOREIGN PATENT DOCUMENTS

CA     2095981    * 10/1993    ................. 474/14

* cited by examiner

Primary Examiner—David A. Bucci
Assistant Examiner—Marcus Charles
(74) Attorney, Agent, or Firm—James C. McLaughlin

(57) ABSTRACT

Continuously variable speed drives (CVT) have improved performance over all shift ratios using an improved flyweight (camweight) that enhances power transfer for higher shift ratios (slower vehicle speeds) without compromising efficiency or performance at smaller shift ratios. Prior art CVTs characteristically have some belt slippage, and attendant power waste and excess wear, when operating with higher shift ratios. The prior art deficiency is due to a tendency of the prior art flyweights not to cause sufficient side forces (axial forces) on the belt at higher shift ratios. The present invention preferably supplements conventional flyweights with a massive shoulder that is a supplemental mass concentration placed near the flyweight's center of rotation, and at an obtuse angle from the center-of-mass (COM) of a conventional flyweight, such that the resultant centrifugal forces effect a desirable axial force. Embodiments are disclosed that allow adjusting the degree of improvement. Measurements are presented showing that improvement may be effected at high and moderate shift ratios. The improved flyweight has utility in flyweight using systems not using belts.

22 Claims, 26 Drawing Sheets

Table 1

| Position | A [mm] | L [mm] | Ra [mm] | CFa [N] | RFa [N] | Spring [N] | SFa [N] | B [mm] | Rb [mm] | Angle ° | CFb [N] | RFb [N] | RFa+b [N] | SFa+b [N] |
|---|---|---|---|---|---|---|---|---|---|---|---|---|---|---|
| 5A | 4.7 | 15.5 | 58.2 | 7470.2 | 2337.6 | 751.5 | 1586.1 | 14.6 | 83.1 | 7.5 | 1382.7 | 1344.0 | 3681.7 | 2930.1 |
| 5B | 9.4 | 19.1 | 59.7 | 7662.7 | 3877.5 | 821.2 | 3056.3 | 13.3 | 86.0 | 14.0 | 1430.9 | 1024.5 | 4901.9 | 4080.7 |
| 5C | 14.1 | 24.1 | 62.4 | 8009.3 | 4839.2 | 917.4 | 3921.8 | 11.3 | 88.8 | 20.0 | 1477.5 | 715.4 | 5554.6 | 4637.2 |
| 5D | 18.8 | 31.8 | 67.0 | 8599.7 | 5389.5 | 1066.6 | 4322.9 | 8.1 | 91.5 | 25.0 | 1522.4 | 411.1 | 5800.6 | 4733.9 |
| 5E | 23.5 | 51.2 | 77.9 | 9998.8 | 5338.2 | 1454.3 | 3883.9 | 0.8 | 93.8 | 29.0 | 1560.7 | 28.4 | 5366.6 | 3912.3 |

8500 RPM
Conventional Flyweight Mass: 54 grams each
Shoulder Mass: 7 grams each

Figure 6

FLYWEIGHT SYSTEM

TECHNICAL FIELD OF THE INVENTION

The present invention is an improvement, and method of using that improvement, to a family of belt-using, variable power transmission systems. Such systems include an endless belt power transmission system using pulleys, such as cone or tapered-face pulleys, with belt receiving surfaces formed by drive faces on axially movable, coaxially confronting members. Generally, such transmissions are called continuously variable transmissions, which will be referred to herein by the common abbreviation of "CVT." More particularly, the variable power transmission systems using the improvement of the present invention axially move the confronting pulley surfaces in response to the centrifugal force produced by the rotational speed acting on a pivoted weight. The pivoted weight is a cam commonly called, and herein called, a camweight or a flyweight. The improvements of the present invention include improvements to the means of producing the centrifugal force so as to produce a more desirable side force on the belt as the shift ratio changes. The utility of the present invention extends to flyweight actuated devices not using belts.

DEFINITIONS

As used herein, "flyweight" and "camweight" are interchangeable.

A "conventional flyweight" consists of a symmetrical head surrounding a pivot axis (with a center) and one arm extending therefrom where the arm has a cam surface that, in operation, engages a roller or the like. The arm is sometimes described as being cantilevered. FIGS. 1A and 1B show examples of conventional flyweights. Characteristically, the head of a conventional flyweight, and its immediate vicinity, consists of an essentially symmetrical mass distribution radially from the center of the pivot axis. One manifestation of such symmetry would be an essentially constant radius from the center of the pivot to the outer edge of the head over approximately a semi-circle. Another manifestation of such symmetry would be the existence of an axis of symmetry extending essentially along the arm through the center of the pivot such that the distance to the outer edge of the head is approximately equal along pairs of radial lines emanating from the center of the pivot that have equal inclinations (angle) to the axis of symmetry.

A Ski-Doo type conventional flyweight is shown on FIG. 1C. The Ski-Doo type conventional flyweight interchanges the cam surface and roller placing the roller on the arm and fixing the cam surface.

"Center-of-mass," abbreviated herein as COM, is the centroid of the mass referred to. All masses have a COM. Because most of the mass of a conventional flyweight is contained in the arm and because of the symmetry of the head, the arm's COM is close to the COM of the entire conventional flyweight.

The "reference line" is the line that is normal to the rotational axis (which is usually the crankshaft center-line) and passes through the center of the pivot of the flyweight being discussed. "Shift ratio" is the ratio of the diameter of the belt passing over the secondary pulley to the diameter of the belt passing over the primary pulley. Shift ratio is also the ratio of the angular velocity of the primary pulley to the angular velocity of the secondary pulley when there is no slippage. Typically, shift ratios vary from about 3:1 (at low vehicle speed) to 0.8:1.

The "plumb line" of a flyweight is, as the name suggests, a plumb line dropped from the center of the pivot of a conventional flyweight that is statically suspended by the pivot while free to rotate about the pivot. It extends in both directions from the center of the pivot and is essentially the same as a line passing through the center of the pivot and the arm's COM. Note that the experimental method of determining the plumb line (just described) is only applicable to a conventional flyweight or a flyweight absent the mass supplements of the present invention. A flyweight according to the present invention shall have its plumb line determined after the removal of the mass concentrations of the present invention. Angles measured from the plumb line start at zero degrees for directions along the plumb line in the direction of the arm and increase in the direction of the cam surface on the arm. The shoulder of the preferred embodiment is preferably placed, integrally formed, or attached to a conventional flyweight so that the COM of the shoulder is within a 60 degree wide sector centered on the pivot's center and extending from 60 degrees from the plumb line to 120 degrees from the plumb line.

"Quadrants," in a plane normal to the pivot's axis, are numbered from one to four increasing counterclockwise from a line segment that is normal to the plumb line and that extends from the pivot center on the side of the flyweight having the cam surface. Counterclockwise is a rotation from the line segment towards the head and clockwise is a rotation from the line segment towards the arm. It follows from the definitions that quadrant 1 encompasses 90 degrees from the plumb line to 180 degrees from the plumb line, that quadrant 2 encompasses 180 degrees from the plumb line to 270 degrees from the plumb line, that quadrant 3 encompasses from 270 degrees from the plumb line to zero degrees from the plumb line, and that quadrant 4 encompasses from zero degrees from the plumb line to 90 degrees from the plumb line. See FIG. 4. For a conventional flyweight, most of the arm and the arm's cam surface are in the fourth quadrant.

Other definitions appear herein.

BACKGROUND

A conventional CVT has two tapered-faced pulleys interconnected with a belt of essentially fixed length. The sheaves of each pulley are able, under control, to move axially. One pulley's shaft is usually connected to the crankshaft of the engine. The system including a pulley, and its ancillary parts, that is connected to the engine is called the driving, driver, or primary clutch. The other pulley is connected through a linkage to the vehicle's drive train. It, and its ancillary parts, is called the driven or secondary clutch. Of necessity, when the sheaves of either pulley are close together, the associated belt must be located at a relatively large radius (distant from the axis of rotation) and when the sheaves of a pulley are far apart the associated belt must be located at a relatively small radius. It is also apparent that in a well designed system, because of the essentially fixed length of the belt, when the sheaves of one pulley are far apart then the sheaves of the other pulley must be close together. Larger shift ratios, characteristic of slower vehicle speeds, occur when the sheaves of the primary pulley are far apart and the sheaves of the secondary pulley are close together (rotational speed of the primary pulley is greater than the rotational speed of the secondary pulley). Smaller shift ratios, characteristic of high vehicle speed, occur when the sheaves of the primary pulley are close together and the sheaves of the secondary pulley are far apart (rotational speed of the primary pulley is less than the rotational speed of the secondary pulley).

Some of the ancillary parts of the primary clutch include a compression spring, or the like, tending to push the sheaves apart such that, at rest, the sheaves of the primary pulley have opened to allow the belt to lie close to the pulley's rotational axis, effecting a large shift ratio. Such a belt position at rest results in the engine having a desirable minimal load when starting. The force produced by this spring increases as the sheaves of the primary pulley get closer together (lower shift ratios) and further compress the spring. Additional ancillary parts of the primary clutch include a set of pivoting flyweights on the primary clutch pushing on a roller, or the like, linked such that the sheave spacing, and thus shift ratio, is responsive to speed and torque needs of the secondary clutch. In the known CVT systems, the net result of the spring and flyweights of the primary clutch includes:

enough primary pulley belt side force to allow the engine to start and promptly to get up to approximately a rotational speed where the engine can deliver maximum power to its shaft;

a belt side force that increases with increasing vehicle speed (decreasing shift ratio) to a peak; and a belt side force that then decreases with increasing vehicle speed.

The undesirable result of the just described belt side force is a tendency to lose power because of belt slippage due to insufficient belt side force while the vehicle is accelerating to near maximum speed. The desirable result of the just described belt side force is a tendency for the system, in the vicinity of maximum vehicle speed, to increase the shift ratio (deliver more torque) when the vehicle slows down. The present invention substantially cures the undesirable characteristic of a conventional system while leaving unchanged the desirable characteristic.

The typical role of the engine is to start, to accelerate promptly to a high rotational speed where the engine can deliver approximately its maximum power, and to remain at that high speed delivering approximately a constant amount of power. Power, in this context, is the product of torque and rotational velocity. The role of the CVT is to apportion the power delivered by the engine into a torque and speed portion depending on the vehicle's speed. When the vehicle is moving slowly, the CVT has a high shift ratio, and the torque factor is relatively large. When the vehicle is moving rapidly, the CVT has a smaller shift ratio, and the torque factor is smaller.

Prior art improvements to flyweights appear to be mostly directed to enhancing performance of CVTs in the neighborhood of maximum vehicle speed, which is expected to be in the vicinity of shift ratios of 0.8:1. In other words, improvements have tended to improve high speed performance. Patents have been directed to improving the shape of flyweights, the distance from the center of rotation of the flyweight and its center-of-mass (COM) located along the flyweight's arm, and the means of supporting the flyweights. Several recent patents have addressed the adjustability of conventional flyweights (i.e. being able to change the mass and COM of the arm of the flyweight without replacing the entire flyweight). U.S. Pat. Nos. 5,562,555 and 5,692,982 to Peterson effect adjustability by changing masses attached to multiple holes extending axially through the arm or by removing part of the arm most distant from the center of rotation while the flyweight is pivotally mounted to the driving clutch. (Axially means essentially parallel to the flyweight's axis of rotation.) U.S. Pat. No. 5,795,255 to Hooper effects adjustability of COM along the arm of a conventional flyweight by changing the mass within a cavity extending longitudinally through the arm. (Longitudinally means essentially at right angle to the flyweight's axis of rotation.) The prior art has resulted in near optimum transfer of power from engine to traction when the vehicle is operated near its top speed.

U.S. Pat. No. 4,826,467 to Reese et al. uses a non-conventional flyweight made up of a pair of arms extending in the same direction that are spaced from each other along the pivot's axis. One of the arms has a driving lip portion at one end (distant from its COM) that might approximate the function of a cam surface and a drive pin extending from its side that causes the other arm to rotate until the COM of the other arm reaches the reference line (where the torque on the other arm becomes zero). Plumb line as used herein was defined previously in terms of a conventional flyweight. However, if one were to drop a plumb line from the center of the Reese pivot while the two arms of Reese are statically suspended by the pivot and free to rotate about the pivot, then one would see that the net COM moves only in the third quadrant even when one arm stops rotating. Reese teaches the use of two spaced arms so as to effect only initially a relatively large arm mass and thereby provide "a much more rapid response to an increased torque requirement at high speeds."

The present invention is directed to improving the performance of CVTs for shift ratios larger than about N:1 where $N \geq 1$, while preserving performance for smaller shift ratios. Experimentally, it has been found that enhanced performance for smaller shift ratios can also be effected. Especially for larger shift ratios, a significant problem of the prior art has been slipping of the belt because of insufficient primary pulley side force on the belt. The prior art type of flyweight effects too little side force at lower vehicle speeds and higher shift ratios. Such insufficiency of side force reduces belt life, wastes fuel, and reduces the performance of the vehicle using a CVT. The preferred embodiment, and alternate embodiments, of the present invention go a long way towards correcting this deficiency of the prior art using a flyweight of unique shape and construction with the potential of field adjustability.

A set of known conventional flyweights is shown on FIGS. 1A, 1B, and 1C. FIG. 1A shows an old art flyweight 10 made by Yamaha and used in their SR540D. It is shown in the *Yamaha* SR540D *Service Manual*, 1st Edition, a publication dated October 1979. FIG. 1A also looks like the flyweight shown on *Model* SSR440B *Snowmobile Parts List*, First Edition, a publication that is dated October 1977. The flyweight has an expected pivot 14A, head 15A, arm 16A, arm COM 17A, and cam surface 18A. The flyweight also has multiple holes-for-rivet 19A that are each adapted to receive one of a set of rivets so as to effect a mass change and COM change. The use of rivets is discussed in the aforementioned Yamaha Service Manual on page 4-4. In operation, cam surface 18A engages a movable roller 50. Also shown on FIG. 1A are reference line 52 and rotational axis 58.

FIG. 1B shows an old art flyweight 10 made by Kawasaki shown in a publication with a title page saying: *Clutch Tuning Handbook* by Olav Aaen B.S.M.E., M.S.I.A. and with a copyright notice by Aaen Performance Parts Inc., 1979. It is believed that this publication is the predecessor, or the first edition, of the now standard publication *Olav Aaen's Clutch Tuning Handbook*, which is now at least available in a 1997 edition. The flyweight has an expected pivot 14B, symmetrical head 15B, arm 16B, arm COM 17B, and cam surface 18B. The flyweight also has at least one hole-for-bolt-and-washer 19B adapted to receive a bolt and washer so as to effect a mass change and COM change. The aforementioned 1979 publication, on page 38, indicates that at least four different flyweights with different masses were available for use, that one nut was used, that two different washers with different masses were available for use, that five different bolts of different masses were available for use, and the provided drawing suggests that bolts and washers can be changed while the flyweights are pivotally mounted. In operation, cam surface 18B engages a movable roller 50. FIG. 1B also shows reference line 52 and rotational axis 58.

The essence of old art flyweight 10 (of FIG. 1B) is believed still to have been in use some years latter from the description found on page 58 of the 1995 edition of *Olav Aaen's Clutch Tuning Handbook*, as follows: "Yamaha also has a special flyweight for racing, where additional tuning washers can be screwed on the bottom of the weight with a bolt." The art of bolting washers to parts of the arm of a flyweight is old.

FIG. 1C shows an old art flyweight 10, made by Ski-Doo for a 1999 MXZX snowmobile with part number 417-0038-01, that appears different, but merely has the elements rearranged. Pivot 14C is at one end of arm 16C with arm-roller 13C at the other end. Pivot 14C is surrounded by head 15C. In operation, cam surface 18C is fixed and is engaged by the moveable arm-roller 13C. Also shown on FIG. 1C are arm COM 17C, reference line 52, and rotational axis 58.

A 1981 SAE paper by David J. Bents (810103) contains efficiency data on CVTs that could be, and was, reformulated to yield the expected near optimum side forces on the driven pulley of a CVT as a function of shift ratio. Optimum, in this case, refers to minimum power being lost in the transfer of power from the engine to traction. The 1981 SAE paper presents measured data of the required axial force (side force needed just to keep the belt from slipping and thus produce the side force that optimizes efficiency of power transmission) as a function of centerline force (force between the hubs of the two pulleys). A family of such curves is presented for both the driven and driver pulleys, and for various shift ratios. Only the information for the drive (primary) pulley/clutch is used here. Once one knows the actual spacing between the two pulleys and the length of the actual belt, one can reformulate the data presented in the SAE paper in terms of the size of the required axial force as a function of the shift ratios used in the SAE paper. The reformulated data indicates that the ideal side force on the primary pulley decreases monotonically, and essentially linearly, with decreasing shift ratio. Clearly, it would be very difficult, if not impossible, to start an engine while it is connected to an ideal clutch system. One could interpose a disk type clutch (similar to that long used in automobiles) or the like between the engine and the ideal clutch system, disconnect the engine from the ideal clutch system while starting the engine, and then engage the disk clutch. The added complexity, wear, and expense of such a scheme seems undesirable. It is then apparent that the ideal operational relationship between side force and shift ratio is one that starts with a modest side force at the highest shift ratio, increases rapidly to a maximum, and then decreases monotonically with decreasing shift ratio. It is an objective of the present invention to provide a way to produce a close approximation to the ideal operational relationship between side force and shift ratio.

It is an objective of the present invention to effect an improved and near optimum side force that minimizes losses in CVT power transmission systems. It is an objective to effect such a near optimum side force over the full range of shift ratios.

It is a further objective of the present invention to provide a system allowing the tailoring of side force versus shift ratio so as to be close to optimum for a particular CVT. It is an objective for such a system not to need to change the mass of the flyweights while tailoring the system. It is an objective for such a system also to provide a way to adjust flyweight moment-of-inertia while tailoring. Alternatively, it is an objective for such a system to change both the mass and the mass distribution of flyweights while tailoring.

It is a further objective of the present invention to provide an improved system able to be retrofitted to existing CVTs with ease.

BRIEF DESCRIPTION

The foregoing and other objectives and advantages are achieved with the apparatus and process disclosed below.

The preferred embodiment of the present invention improves conventional flyweights (see examples on FIGS. 1A, 1B, and 1C) by integrally forming thereto a massive shoulder (see FIG. 2A) just beyond the head of a conventional flyweight. The preferred shoulder is a mass concentration (i.e. massive) with a COM located more than 10 millimeters from the pivot center and that is positioned within a 60 degree wide sector centered at the pivot's center and extending from 60 degrees from the plumb line to 120 degrees from the plumb line. Preferably, the shoulder's COM is located approximately at right angles to the reference line. FIGS. 2A, 3, and 4 show the preferred embodiment.

The present invention encompasses adding one or more mass concentrations to a conventional flyweight in locations in addition to, or different from, those of the preferred embodiment. The COM of each mass addition or supplement of the present invention is located at least a small distance from the surface of the associated conventional flyweight. "Adding," or "supplementing" includes attaching and/or integrally forming the supplemental mass or masses.

At rest, a flyweight imposes no force on the roller because no centrifugal force is produced at rest. To enable the engine to start under only a small load, a compression spring furnishes an appropriate, negligible belt side force such that the belt is essentially decoupled during starting. Just after starting, the arm's COM is close to the reference line and between the pivot and rotational axis, thus most of the centrifugal force is into the pivot rather than against the roller (which would have ultimately produced belt side force). Just after starting, the preferred embodiment's shoulder's COM is farther from the rotational axis than the arm's COM and thus its centrifugal force term has a larger radius portion, and, since the shoulder's COM is approximately at right angles to the reference line, the shoulder will produce a significant force against the roller greatly enhancing the belt side force over what would result without the shoulder.

In summary, for the preferred embodiment of the present invention, as shift ratio decreases (vehicles's speed increases):

(1) the torque from the arm's COM increases (increasing the force on the roller that tends to increase the belt side force);

(2) the torque from the shoulder's COM decreases (to zero when the shoulder's COM is on the reference line) and further decreases in shift ratio beyond the point where the shoulder's COM is on the reference line (further rotation of flyweight) will cause the shoulder's COM to subtract torque from that produced by the arm's COM; and (3) the sheaves of the primary pulley will become closer together causing the opposing force due to the compression spring to increase.

The desired resultant effect of the preferred embodiment of the present invention is to have a side force component due just to the use of the preferred embodiment that decreases with increased vehicle speed (decreased shift ratio) while the net side force increases rapidly to a peak and then more slowly decreases with decreasing shift ratio (increasing vehicle speed). The shoulder of the preferred embodiment of the present invention causes a desirable large starting torque (proportional to side force) that gets smaller with increasing vehicle speed (even possibly subtracting torque) and the spring also tends to reduces side force as the vehicle speed increases (since the spring is increasingly compressed as the shift ratio decreases). Net side force as a function of shift ratio produced by the preferred embodiment of the present invention is desirable and different from the prior art.

FIGS. 2B and 2C show alternate embodiments of the preferred embodiment that are provided with structure that facilitates adjustment. FIG. 2B shows at least one arm-hole 39 that could receive a rivet or bolt and washer (in the manner of the Yamaha flyweight shown on FIG. 1A or in the manner of the Kawasaki flyweight shown on FIG. 1B) and an axial shoulder-hole 32 in shoulder 31 that may be used to attach mass to shoulder 31. FIG. 2C shows at least one arm-hole 49 that could receive a rivet or bolt and washer (in the manner of the Yamaha flyweight shown on FIG. 1A or in the manner of the Kawasaki flyweight shown on FIG. 1B) and a longitudinal shoulder extension 42 in shoulder 41 that may be used to attach mass to shoulder 41.

An additional embodiment is shown on FIG. 2D. The alternate-flyweight 70 includes shoulder-piece 71 and arm-piece 76 having cam surface 78. Shoulder-piece 71 and arm-piece 76 overlay each other such that the two rotate as one until shoulder-piece 71 touches obstruction 80. Thereafter, arm-piece 76 may continue to rotate while shoulder-piece 71 ceases rotation.

A further embodiment is shown on FIGS. 2E1 and 2E2 as flyweight 90. In this embodiment, shoulder 21 of the preferred embodiment is replaced by massive toggle shoulder 91 that is attached to head 95 with secondary pivot 92. Flyweight 90 as a whole revolves about pivot 94 while toggle shoulder 91 toggles between at least two positions.

FIG. 2F shows the manner that the present invention would use to place the preferred massive shoulder on head 15C to effect Ski-Doo shoulder 11C.

DESCRIPTION OF THE FIGURES

FIG. 2D2 is a side view of the assembled alternate embodiment at rest and the cooperating obstruction.

FIGS. 2D3 through 2D5 are side views of the assembled alternate embodiment rotating through decreasing shift ratios and shows how the obstruction halts the rotation of the shoulder-piece.

FIGS. 2E1 and 2E2 are side views of an alternate embodiment that uses a toggled shoulder. FIG. 2E1 shows arrangement for a large shift ratio and FIG. 2E2 shows arrangement for a small shift ratio.

FIG. 3 is a side view of a preferred embodiment flyweight and roller whereon are marked: the reference line; rotational axis; dimension "A" (distance of arm's COM from reference line); dimension "Ra" (radial distance from rotational axis to COM of arm); dimension "B" (distance of shoulder's COM from reference line); dimension "Rb" (radial distance from rotational axis to COM of shoulder); and dimension "L" (distance parallel to rotational axis from the center of the pivot to osculation point of cam weight and roller).

FIG. 5 shows five positions of preferred embodiment of present invention and roller as shift ratio decreases. Cam reaction angle 53 is also shown.

FIG. 6 shows Table 1. Table 1 tabulates relevant dimensions & forces versus positions of flyweight. It is assumed that there are three conventional flyweights of 54 grams each and three shoulders of 7 grams each with a drive shaft rotation of 8,500 rpm. A, L, Ra, B, Rb and Angle are dimensions shown on FIGS. 3 or 5. The "a" subscript items refer to the conventional flyweights alone and the "b" subscript items refer to just the shoulders alone. CFa is the centrifugal force at the arm's COM due to rotation, RFa the resultant force at the roller, Spring is the spring force, and SFa is the resultant side force due to the arm's rotation. CFb is the centrifugal force at the shoulder's COM due to rotation, RFb the resultant force at the roller, Spring is the spring force, RFa+b the resultant force at the roller due to both the arm and shoulder, and SFa+b is the resultant side force due to both arm and the shoulder's rotation. SFa is the side force that would be seen using just the conventional flyweight and SFa+b is the side force resulting from the flyweight improved by the preferred embodiment of the present invention, which is the shoulder.

DESCRIPTION OF THE PREFERRED EMBODIMENT AND ALTERNATE EMBODIMENTS

The present invention includes improvements to methods of producing centrifugal force, and thus the side force on the belt of a CVT resulting in reduced or no belt slippage, and includes improvements to flyweights and the means of biasing the flyweights. Preferably, the improved method includes strategically causing an asymmetrical rotational inertia (J) in the vicinity of a flyweight's head.

The practice of the present invention includes supplementing a conventional flyweight with one or more mass concentrations having their COMs more than 10 millimeters from the flyweight's pivot's center in the first, second, and third quadrants. In the third quadrant, supplementing mass concentrations have their COMs more than 10 millimeters from the plumb line. The practice of the present invention also includes supplementing a conventional flyweight with one or more mass concentrations having their COM's more than 10 millimeters from the head and arm of the conventional flyweight. All of these implementations of the present invention, and those to follow, perform the same desirable function in essentially the same manner as herein described.

Figure 2A:
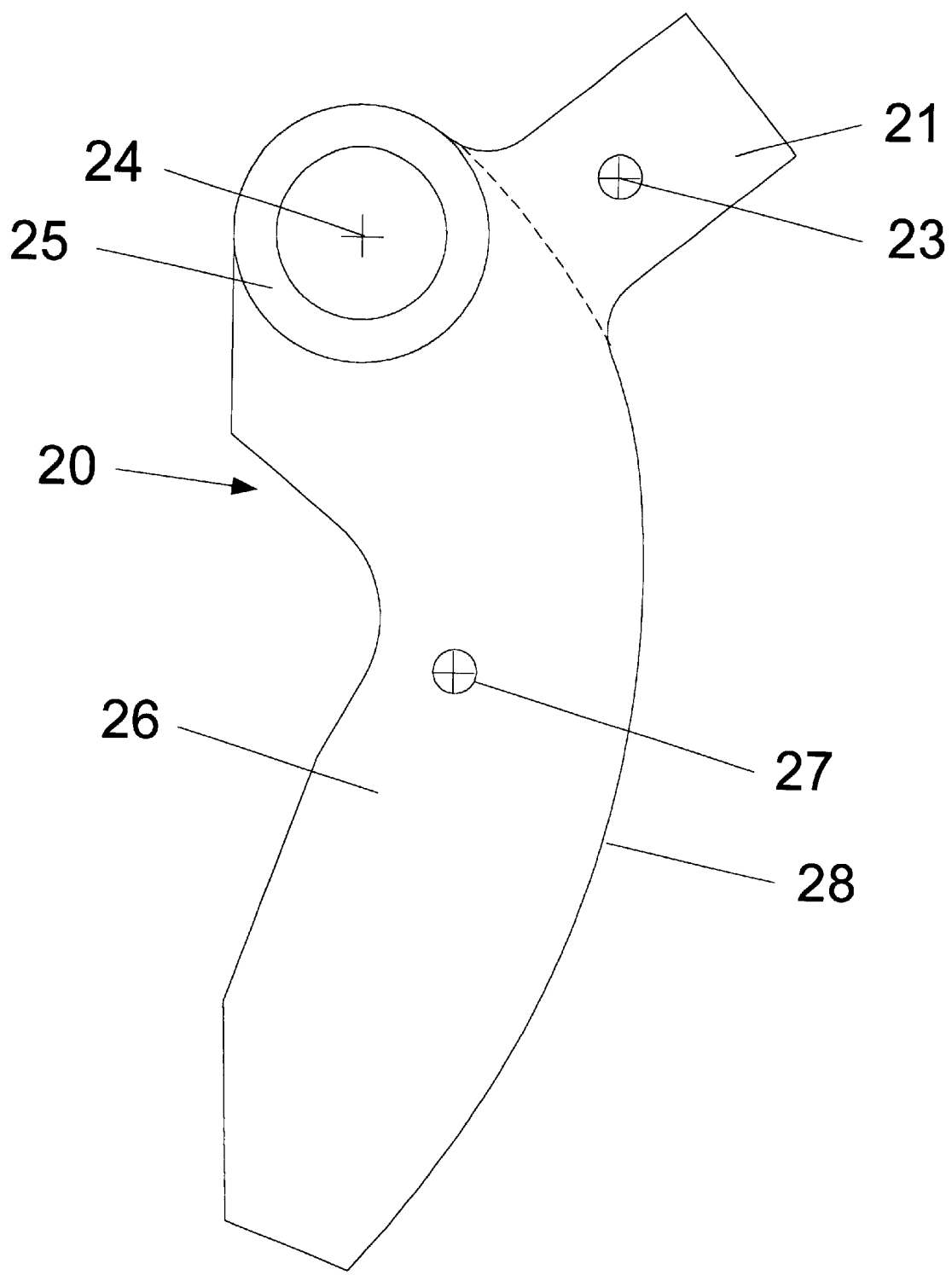
FIG. 2A is a side view of the preferred embodiment of the present invention with a shoulder integrally formed in the first quadrant.
Figure 2B:
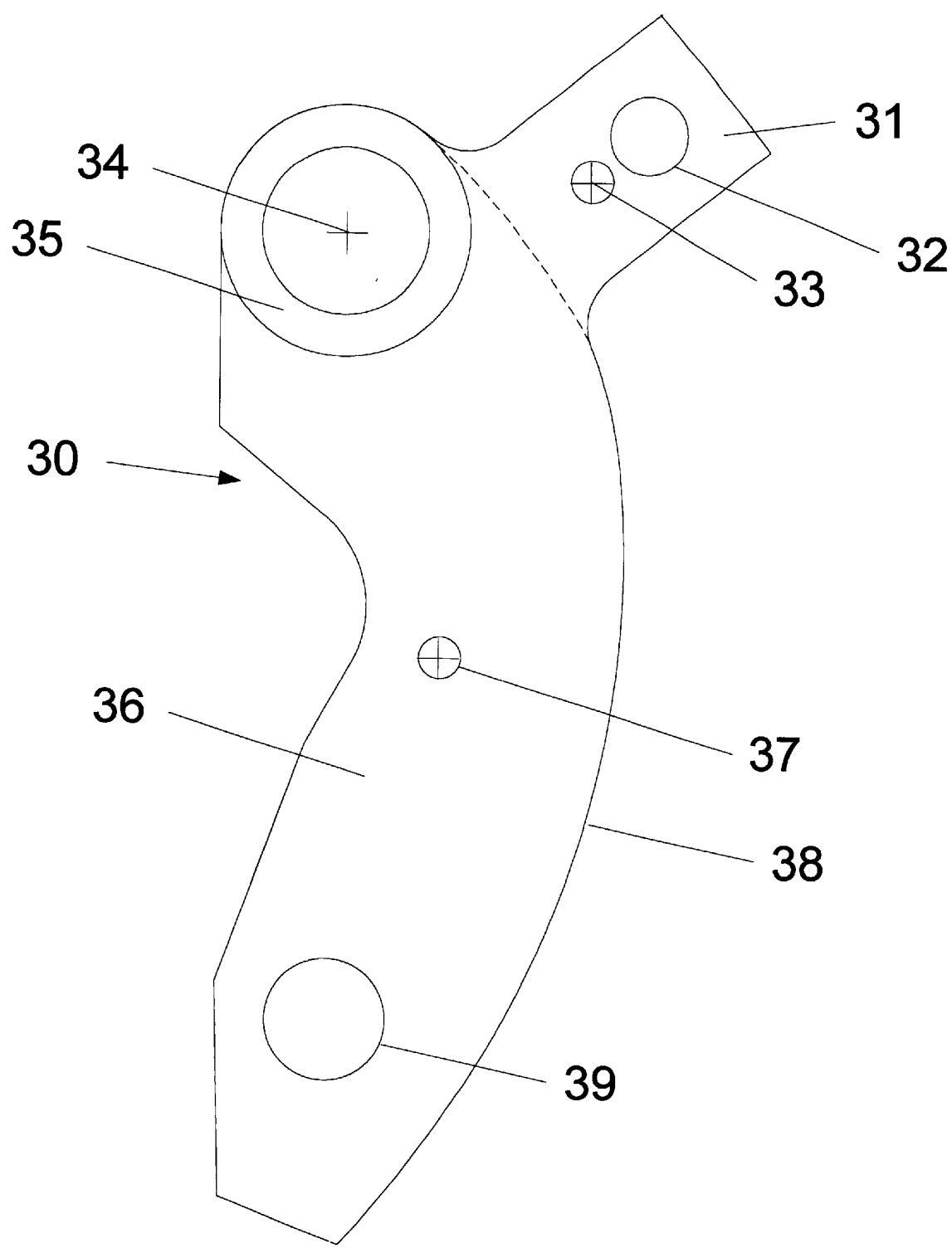
FIG. 2B is a side view of an adjustable present invention with an arm-hole and a shoulder-hole where mass may be changed in the manner of Yamaha's flyweight.
Figure 2C:
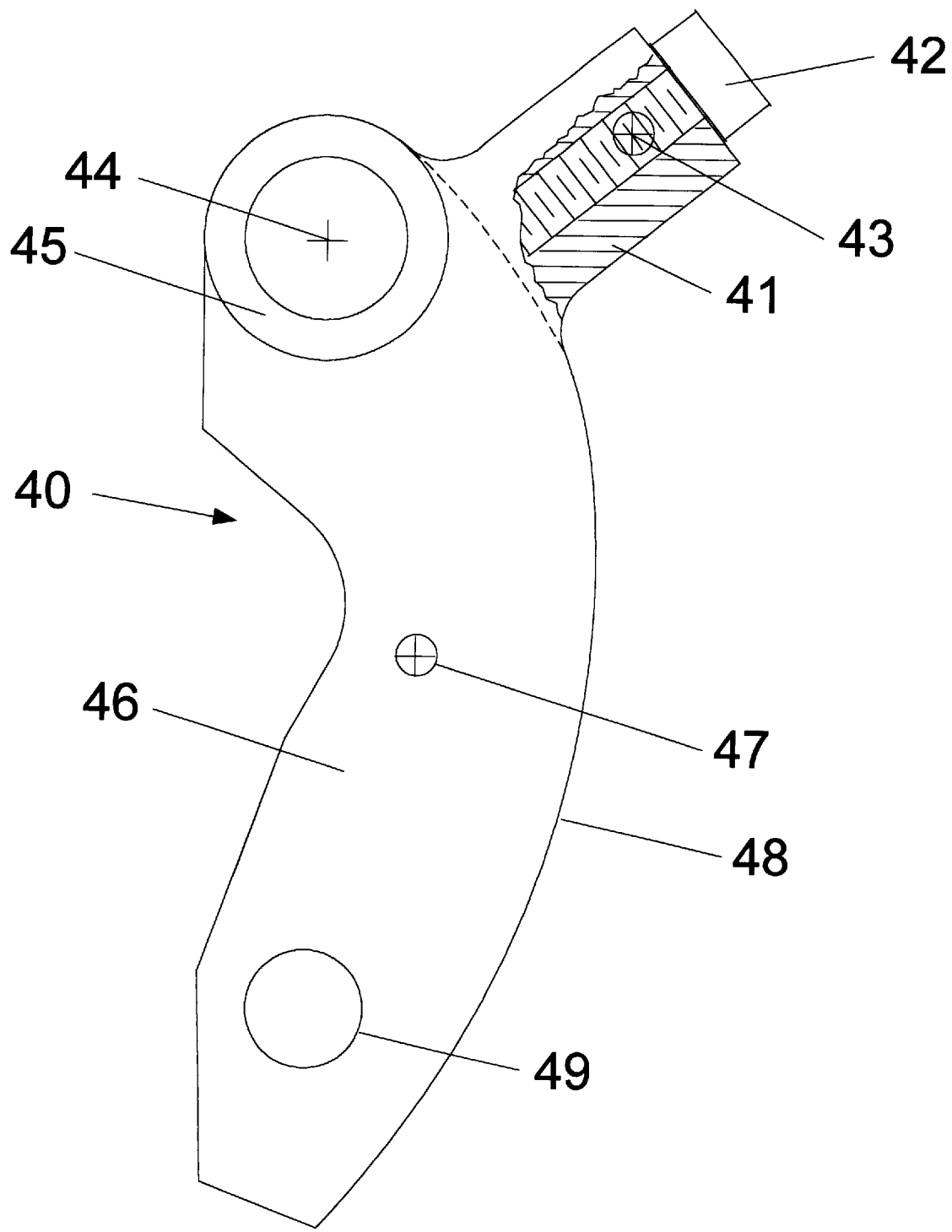
FIG. 2C is a side cross section view of an adjustable present invention with an adjustable longitudinal extension to the shoulder.
Figures 1, 2D:
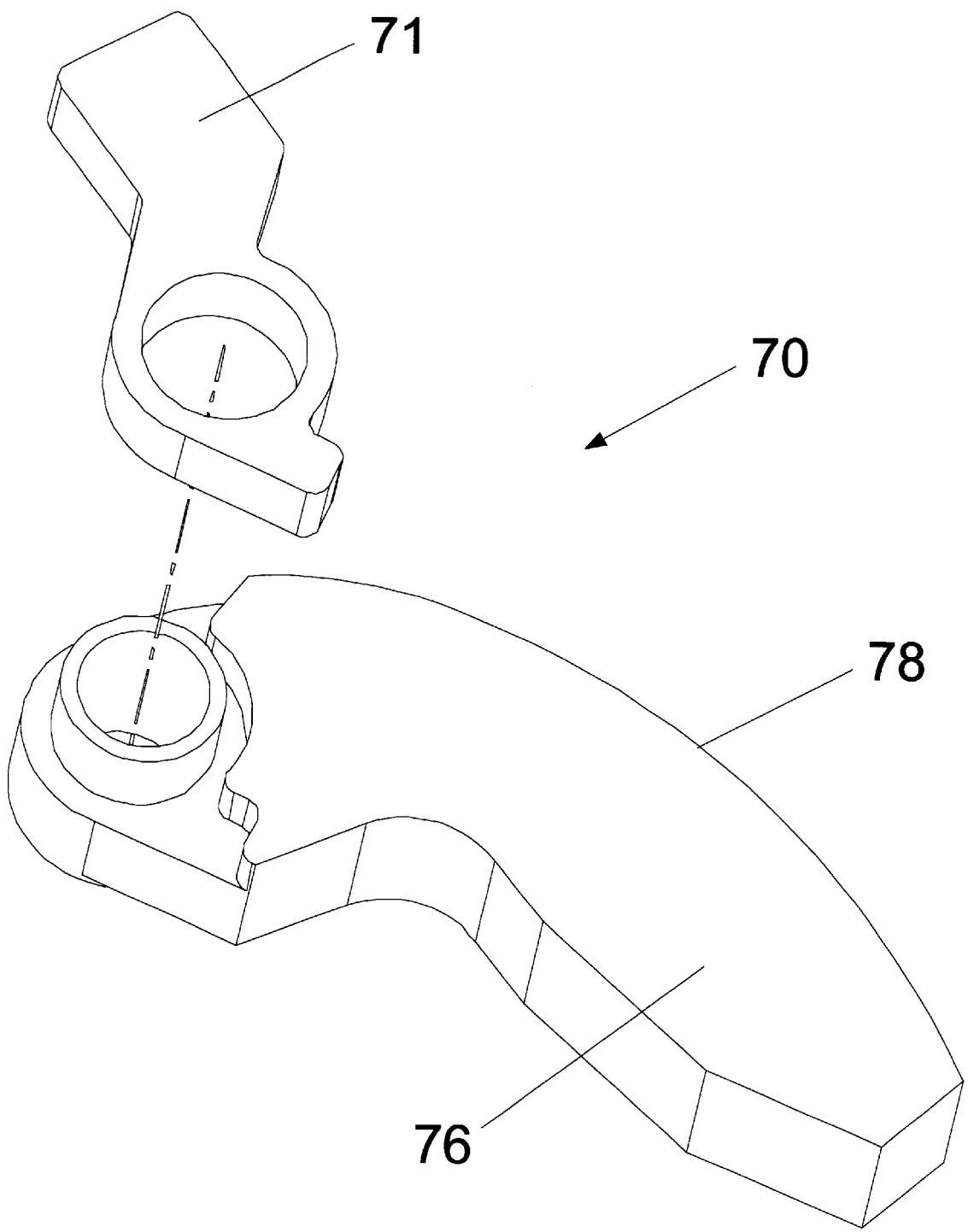
FIG. 2D1 is an exploded view of an alternate embodiment with a rotating shoulder-piece showing how the shoulder-piece might be rotationally attached to flyweight.
Figures 2, 2D:
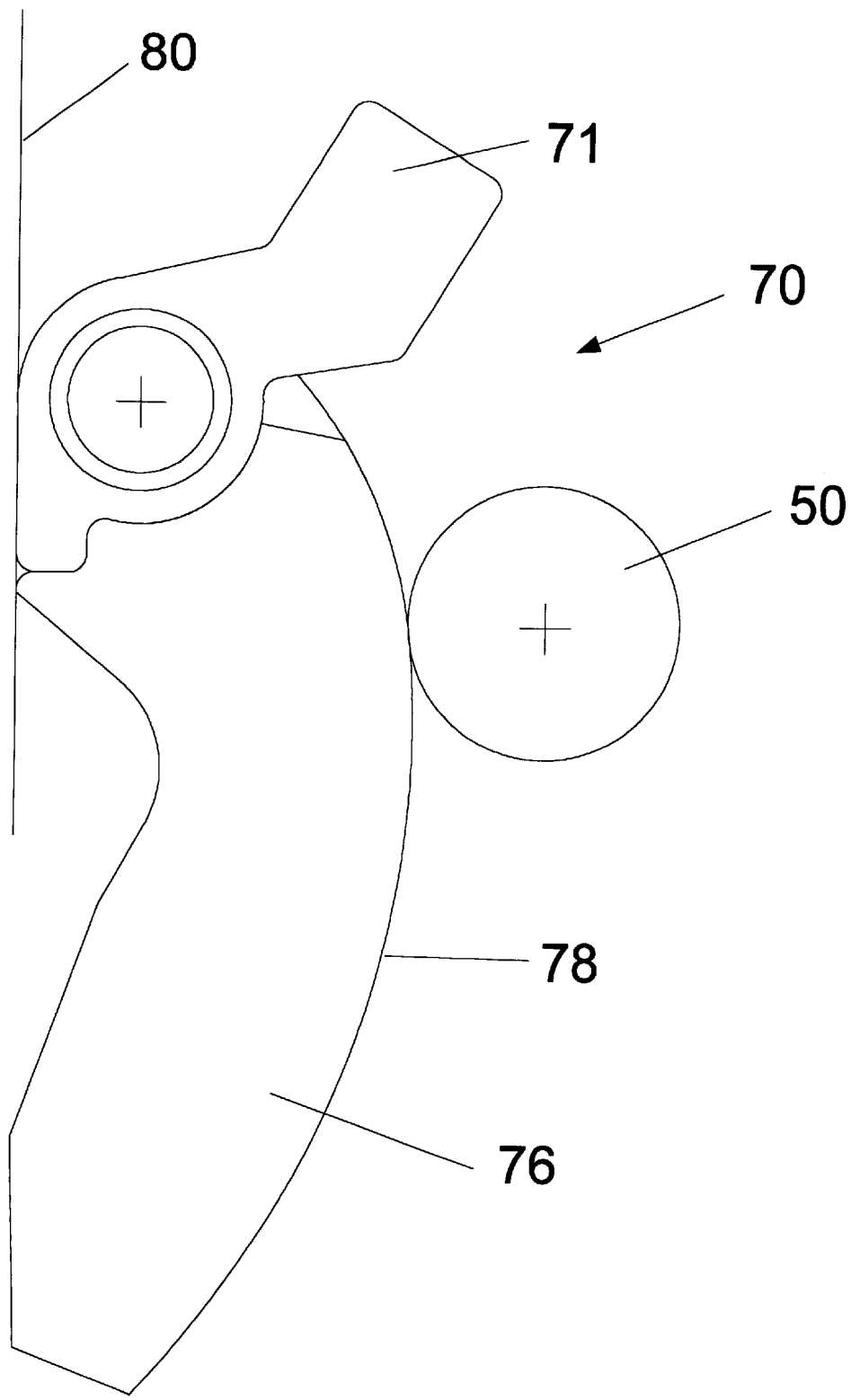
Figures 2, 2D, 3:
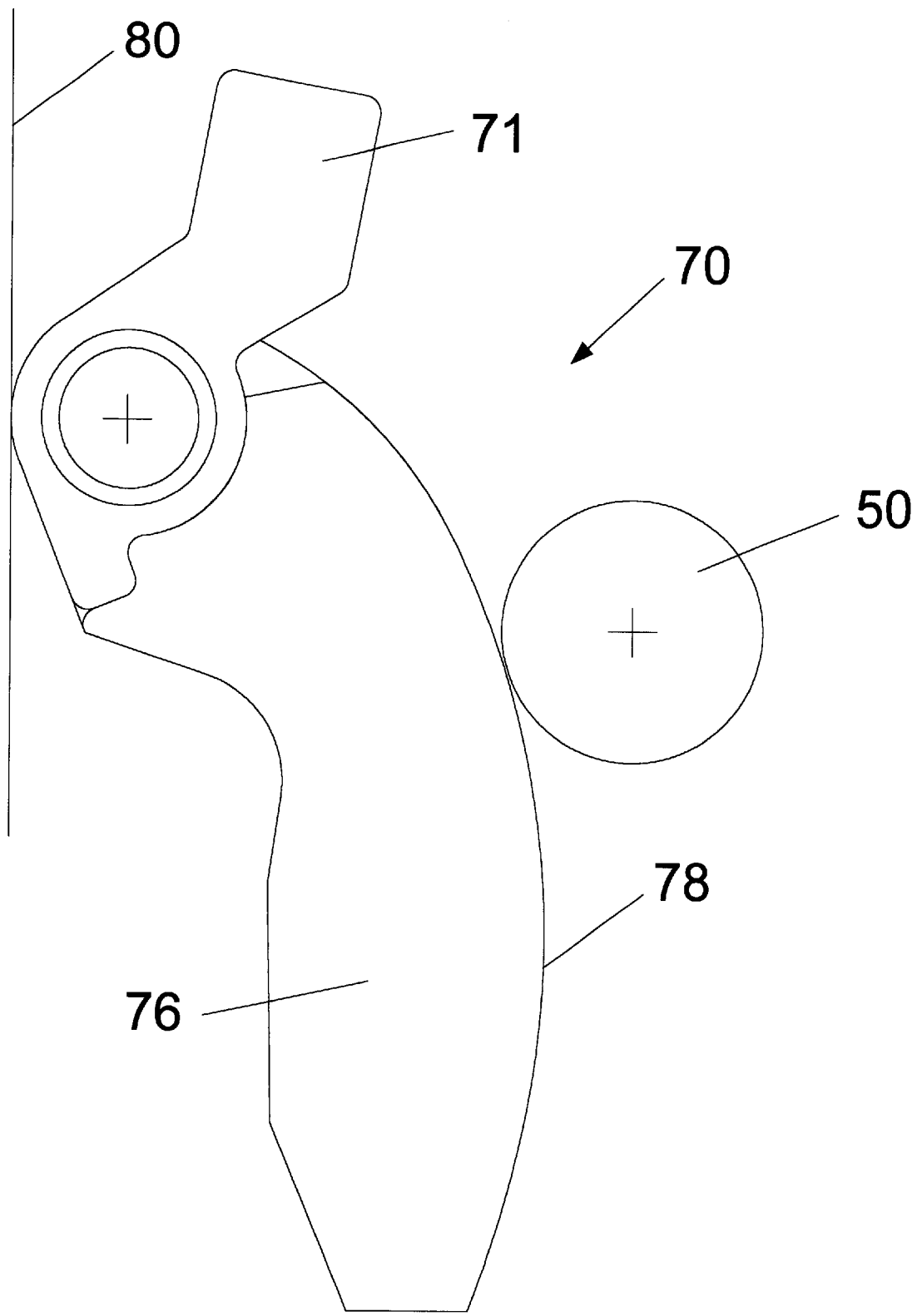
Figures 2, 2D, 3, 4:
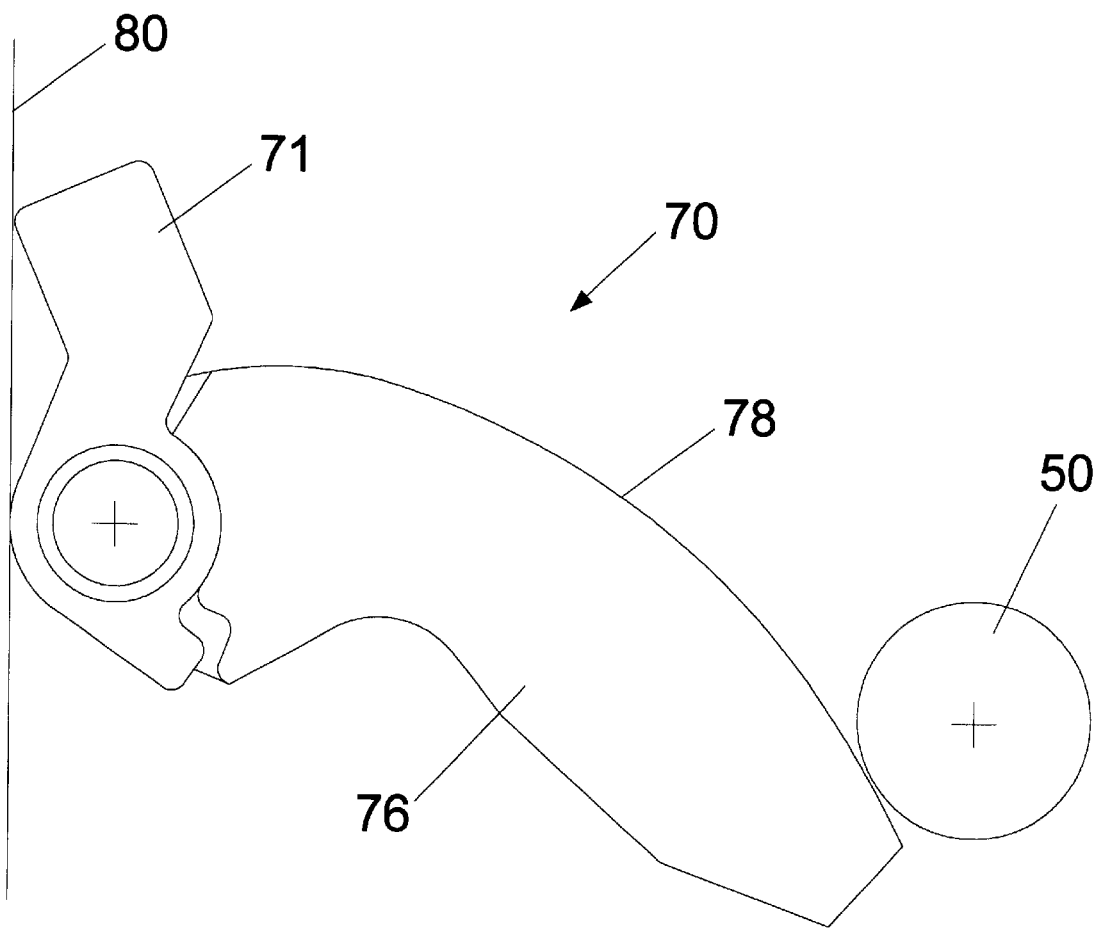

The preferred embodiment:

The preferred embodiment of the present invention (flyweight 20) is shown on FIG. 2A and is shown in relation to other parts of its associated CVT on figures that include FIG. 3 and FIG. 4. The preferred embodiment supplements a conventional flyweight having pivot 24, symmetrical head 25, and arm 26 having arm COM 27, and cam surface 28. The supplement of the preferred embodiment is the attachment of a massive shoulder 21, having shoulder COM 23, to head 25 such that shoulder COM 23 is approximately normal to the reference line. The supplement, shoulder 21, effects the improvement of the present invention. The preferred embodiment integrally forms shoulder 21 with head 25. The present invention includes other methods of effecting shoulder 21 such as welding, bolting, clamping, screwing pinning stapling, gluing, or using a tongue-and-groove method.

The supplementation of the present invention, however effected, improves the utility of conventional flyweight's supplying of force to its associated device, usually a belt-using CVT. The presence of a belt-using CVT is not critical to the utility of the present invention's improved flyweight, however an associated belt-using CVT will be assumed in the descriptions herein.

The visual manifestation of the preferred embodiment of the present invention is massive shoulder 21. Shoulder 21 is preferably placed, integrally formed, or attached to a conventional flyweight so that the COM of shoulder 21 is within a 60 degree wide sector centered on pivot 24 and extending from 60 degrees from the plumb line to 120 degrees from the plumb line. Additionally, the COM of shoulder 21 is preferably more than ten millimeters from the pivot center.

The effect of the visual part of the preferred embodiment has significant and unexpected utility. As has been discussed, shoulder 21 adds a mass positioned so that when there is rotation about rotational axis 58 additional torque is produced about the pivot (as compared to a conventional flyweight alone) that translates into enhanced force into roller 50, that, in turn, translates into enhanced side force on the sheaves of the primary pulley. (See FIGS. 3, 4, and 5.) As flyweight 20 rotates (relative to the reference line) with decreasing shift ratio, shoulder 21 will rotate towards reference line 52 resulting in a reduction in the torque produced by shoulder 21. The expected net result is that side force as a function of shift ratio when using shoulder 21 is closer to ideal than is the function of side force as a function of shift ratio that results when shoulder 21 is not used.

FIGS. 5A through 5E show the position of the preferred embodiment and roller 50 for a sequence of rotations of flyweight 20 corresponding to decreasing shift ratio. Each figure indicates how the critical dimensions including cam reaction angle 53 are measured. The actual values for a typical flyweight are found in Table 1 on FIG. 6 under the assumption of a rotational velocity of 8500 rpm, a flyweight mass of 54 grams, a shoulder mass of 7 grams, typical linkages, and three flyweights.

FIG. 6's Table 1 also shows the results of calculating side force due to the arm's COM, due to the shoulder's COM, and due to both combined. Some of the intermediate results are also shown on Table 1. A, L, Ra, B, Rb and Angle (cam reaction angle 53) are dimensions shown on FIG. 3 or 5. CFa is the centrifugal force at the arm's COM due to rotation, RFa the resultant force at the roller, Spring is the spring force, and SFa is the resultant side force due to the arm's rotation. CFb is the centrifugal force at the shoulder's COM due to rotation, RFb the resultant force at the roller, Spring the spring force, RFa+b the resultant force at the roller due to both the arm and shoulder, and SFa+b is the resultant side force due to both arm and the shoulder's rotation. SFa is the side force that would be seen using just the conventional flyweight and SFa+b is the side force resulting from the flyweight improved by the preferred embodiment of the present invention.

Figure 7:
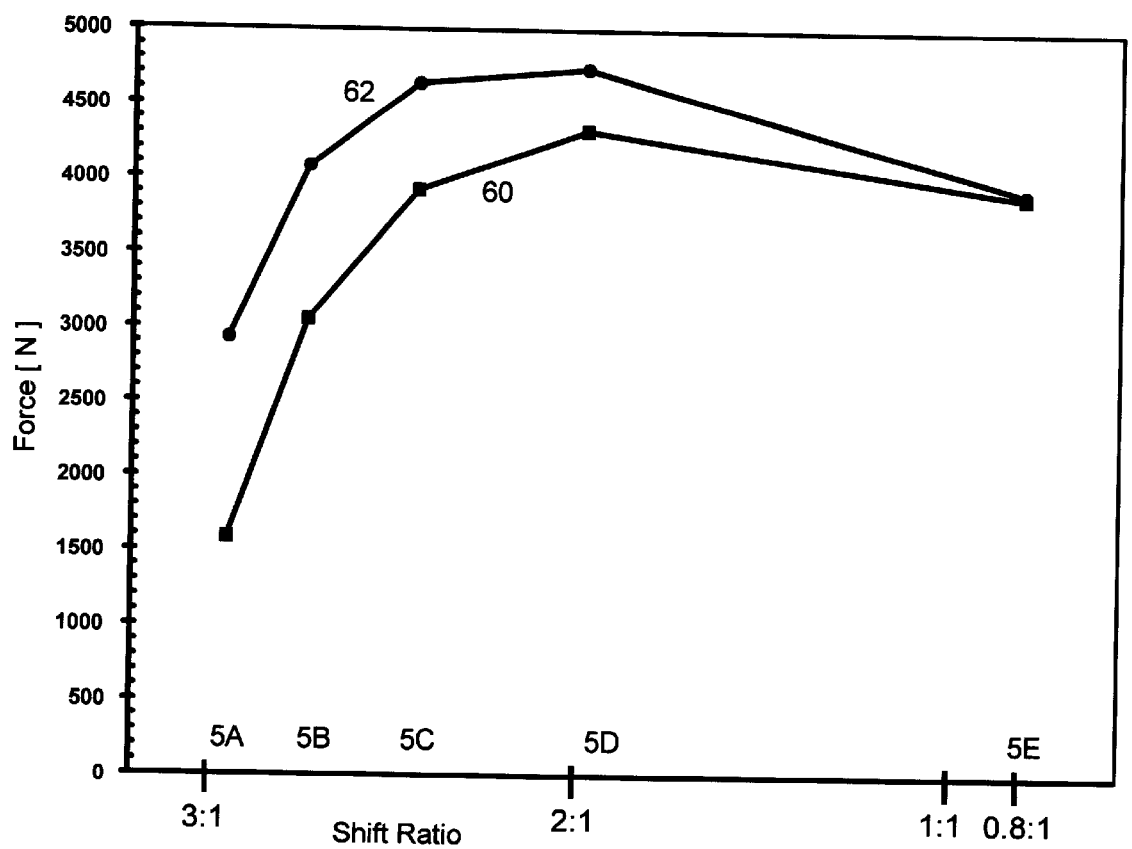
FIG. 7 is a graph of side force versus position (shift ratio) for conventional flyweight and for the conventional flyweight improved by the present invention. Data used is found in Table 1 as SFa & SFa+b.

FIG. 7 shows two curves of side force as a function of positions and approximate corresponding shift ratio. One curve is side-force-without-shoulder 60 (conventional flyweight without shoulder) and the other curve is side-force-with-shoulder 62 (preferred embodiment flyweight with shoulder). The values plotted are from Table 1. Side-force-with-shoulder 62 starts off (large shift ratio) above side-force-without-shoulder 60 (as expected) and the difference between the curves decreases with decreasing shift ratio.

The calculated curves of FIG. 7 show that the preferred embodiment (as compared to the unimproved conventional flyweight) will cause the belt to be gripped more tightly after the engine starts and runs up to about optimum rpm (maximum power rpm), will continue to cause the belt to be gripped more tightly as the vehicle increases velocity, and will cause the extra gripping to tapper down with decreasing shift ratio so as to maintain near optimum gripping at small shift ratios. The inevitable result is less belt slippage, especially at larger shift ratios. In turn, that will cause an increase in efficiency and in vehicle acceleration without detriment to the conventional flyweight's putative optimization of side forces near maximum vehicle velocity.

Figure 8A:
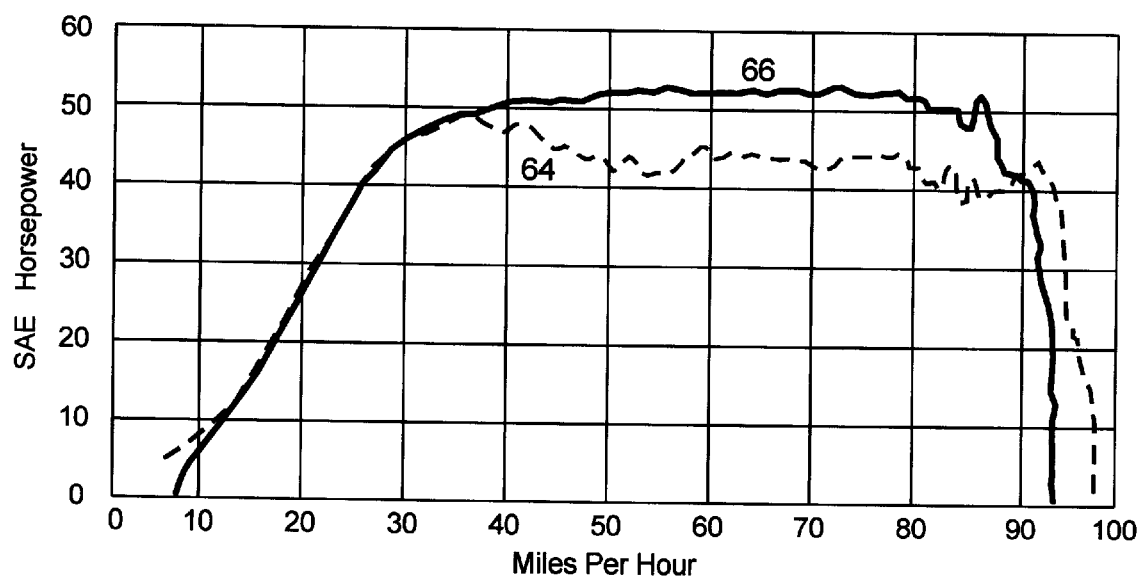
FIGS. 8A and 8B show measured delivered HP versus miles-per-hour (MPH) for a snowmobile. Each Figure shows the result of a different tuning. For each tuning, one curve is measured performance with a conventional flyweight and the other curve is measured performance with the conventional flyweight improved by the present invention.
Figure 8B:
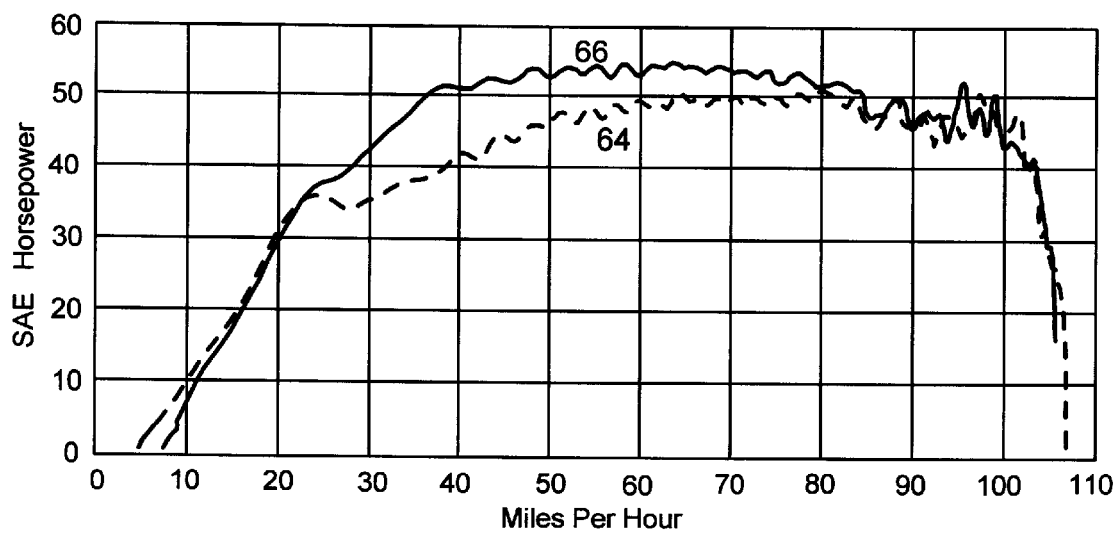

FIGS. 8A and 8B show measured data. These figures show actual traction power (in horsepower, HP) of a snowmobile (using two tunings of the CVT system) as a function of vehicle speed (in miles-per-hour). On both figures, HP-without-shoulder 64 is measured without using a shoulder and HP-with-shoulder 66 is measured using a shoulder. Low speed (high shift ratio) improvement is not too evident on FIG. 8A, but significant improvement is seen at higher speeds. It appears that in this case (FIG. 8A) the shoulder's mass and position was such as to postpone their major beneficial effects until higher vehicle velocity was attained. FIG. 8B shows the more expected situation where the effect of the shoulder is predominately seen at lower speeds. Clearly, the present invention has an unexpected utility both for improving performance in the lower speed region and in the higher speed region depending on the selection of tuning components. FIGS. 8A and 8B do not necessarily represent optimum use of the present invention.

Alternate Embodiments

Figure 1A:
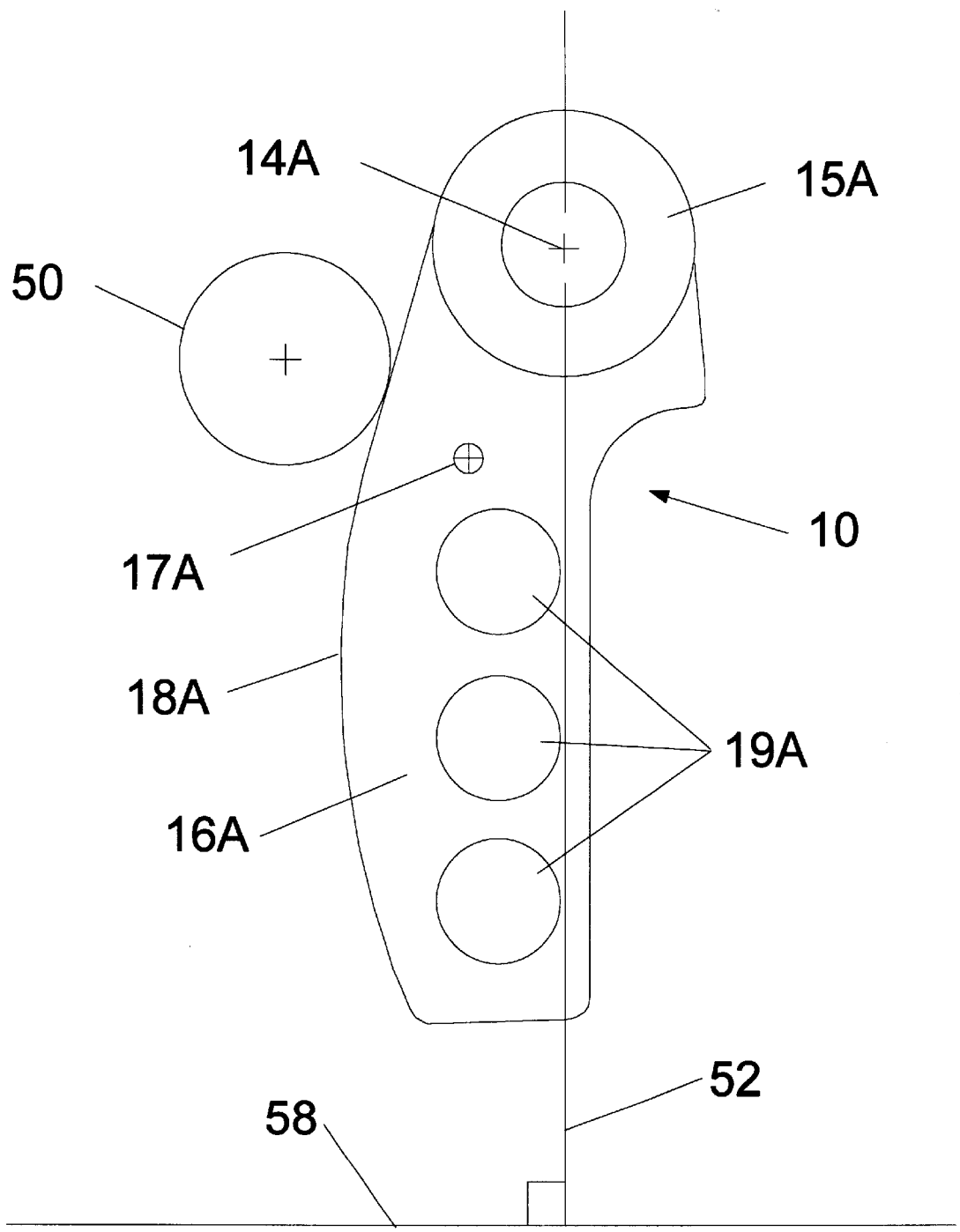
FIG. 1A is a side view of a conventional flyweight. Shown is a flyweight made by Yamaha for at least their SSR440B and SR540D snowmobiles. It has multiple bores or holes wherein rivets may be placed to effect mass changes and potentially change COM. The reference line and the rotational axis are shown.
Figure 1B:
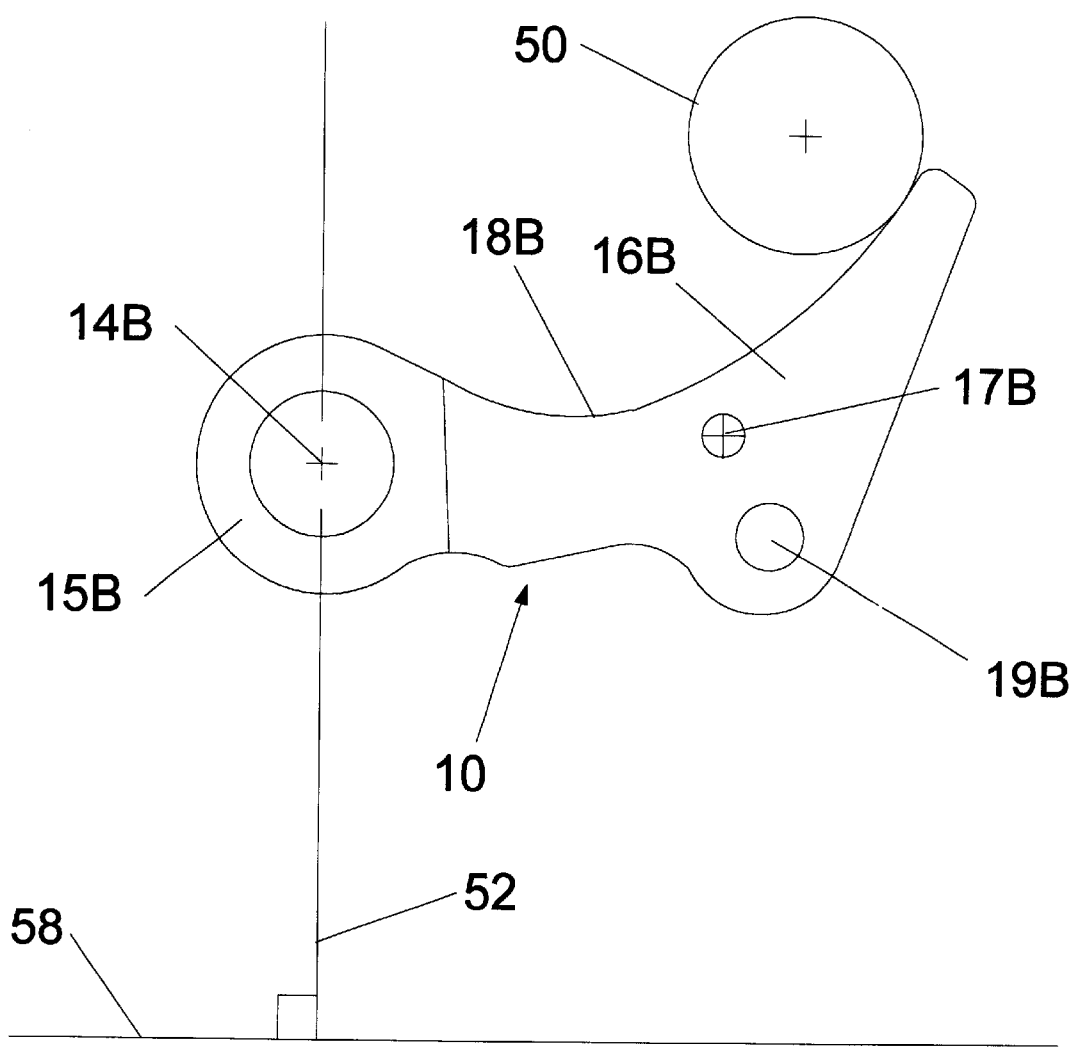
FIG. 1B is a side view of a conventional flyweight. Shown is a Kawasaki flyweight having at least one hole able to receive a bolt and washer to effect mass change. The reference line and the rotational axis are shown.
Figure 1C:
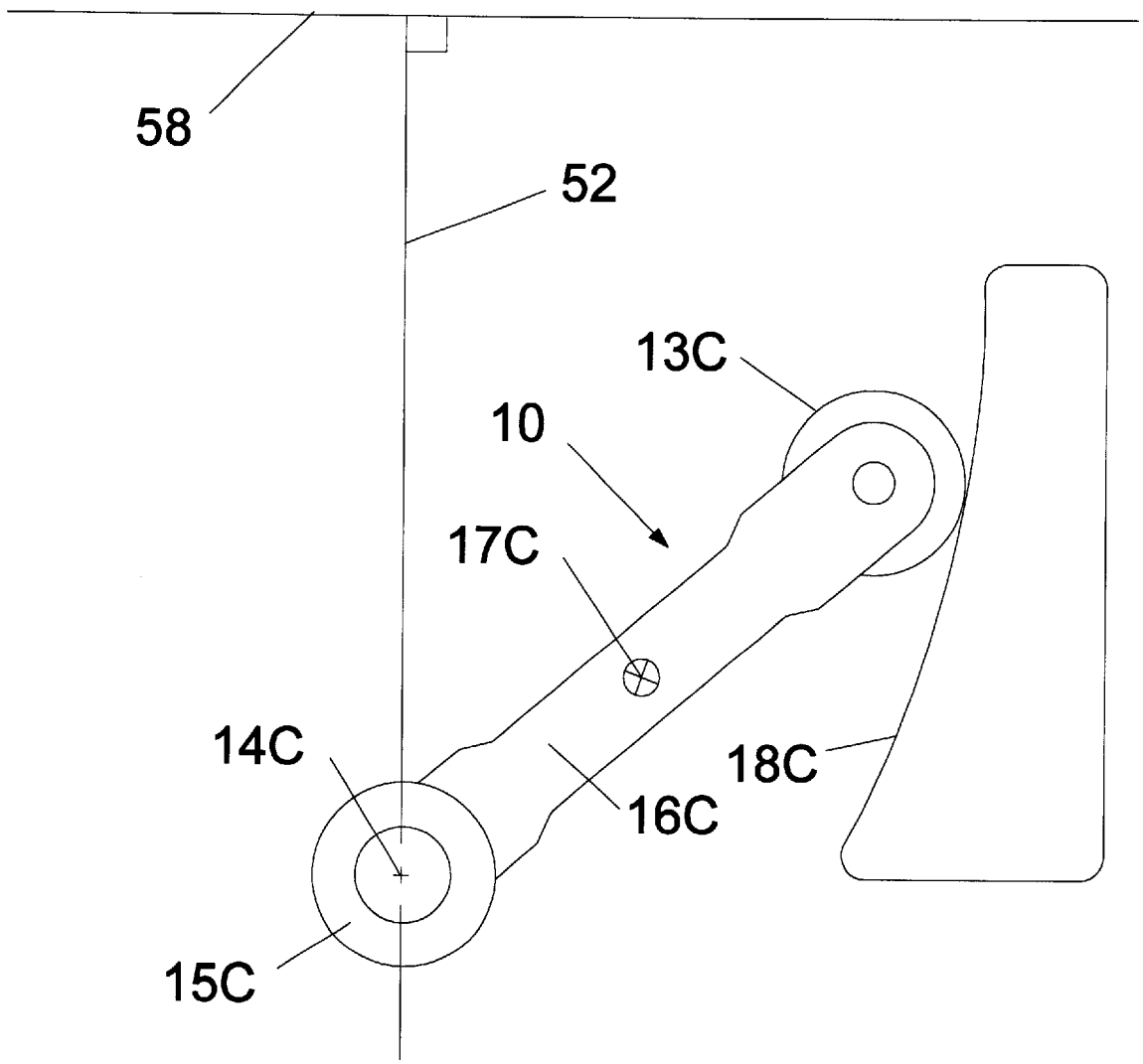
FIG. 1C is a side view of a Ski-Doo type conventional flyweight. Shown is a flyweight made by Ski-Doo for a 1999 MXZX snowmobile where the cam surface is fixed. The reference line and the rotational axis are shown.

FIGS. 2B and 2C show alternate embodiments of the preferred embodiment that are provided with structure that facilitates adjustment. FIG. 2B shows at least one arm-hole 39 that could receive a rivet or bolt and washer (in the manner of the Yamaha flyweight shown on FIG. 1A or in the manner of the Kawasaki flyweight shown on FIG. 1B) and an axial shoulder-hole 32 in shoulder 31 that may be used to attach mass to shoulder 31. FIG. 2C shows at least one arm-hole 49 that could receive a rivet or bolt and washer (in the manner of the Yamaha flyweight shown on FIG. 1A or in the manner of the Kawasaki flyweight shown on FIG. 1B) and a longitudinal shoulder extension 42 in shoulder 41 that may be used to attach mass to shoulder 41.

The alternate embodiment shown on FIG. 2B (flyweight 30) includes massive shoulder 31 having shoulder-hole 32 and shoulder COM 33; head 35 surrounding pivot 34 having a center; and arm 36 with arm COM 37, cam surface 38, and arm-hole 39. Shoulder-hole 32 provides an attachment site for mass to supplement the mass of shoulder 31 and is an orifice through shoulder 31 essentially parallel to the rotational axis of flyweight 30. Such attachment may be effected by conventional means.

The alternate embodiment shown on FIG. 2C (flyweight 40) includes massive shoulder 41 having shoulder extension 42 that is threaded into shoulder 41 with resultant shoulder COM 43; head 45 surrounding pivot 44 having a center; and arm 46 with arm COM 47, cam surface 48, and arm-hole 49. The net mass of shoulder 41 (and position of shoulder COM 43) may be adjusted by threading various shoulder extensions 42 having different amounts of mass. Methods other than threading may be used to receive and hold a shoulder extension 42 within shoulder 41. Shoulder 41 is adapted to receive supplemental masses (in the form of shoulder extension 42) with an orifice into shoulder 41 that is essentially normal to the rotational axis of flyweight 40. Customary tightening torque applied to shoulder extension 42 has been found to be sufficient to retain shoulder extension 42 within shoulder 41 in normal operation. However, the application of a thermal releasing adhesive to the threads of shoulder extension 42 could be used. Arm-hole 49 may be used as such holes have been used for many years to change the mass of arm 46.

The preferred manner of using the present invention is to attach a massive shoulder to at least one conventional flyweight, where the shoulder has a COM that is positioned within a 60 degree wide sector centered at the pivot's center and extending from 60 degrees from the plumb line to 120 degrees from the plumb line. Optionally, the massive shoulder is adapted to receive supplemental masses by either placing an orifice through the shoulder that is essentially normal to the flyweight's rotational axis or placing an orifice through the shoulder that is essentially parallel to the flyweight's rotational axis. The preferred manner of using the present invention may also include providing an adjustable spring means that partially opposes the effects of the rotation of flyweights.

An additional embodiment is shown on FIG. 2D1. This embodiment has a like appearance in profile, and similar functionally, to the preferred embodiment in that a shoulder supplements a flyweight. The shoulder 21 of the preferred embodiment has a fixed relationship to the arm 26 of the preferred embodiment so that shoulder 21 could rotate to, and even beyond, reference line 52, whereas this embodiment provides for the shoulder to rotate only a specified amount by providing a rotational attachment between shoulder and arm with an external obstruction selectively stopping rotation of just the shoulder. The alternate-flyweight 70 includes shoulder-piece 71 and arm-piece 76 having cam surface 78. Shoulder-piece 71 and arm-piece 76 overlay each other such that the two rotate as one until shoulder-piece 71 touches obstruction 80 (seen on FIGS. 2D2–2D5). Thereafter, arm-piece 76 may continue to rotate while shoulder-piece 71 ceases rotation. This embodiment provides an additional adjustment to the preferred embodiment.

Figures 2, 2D, 3, 4, 5:
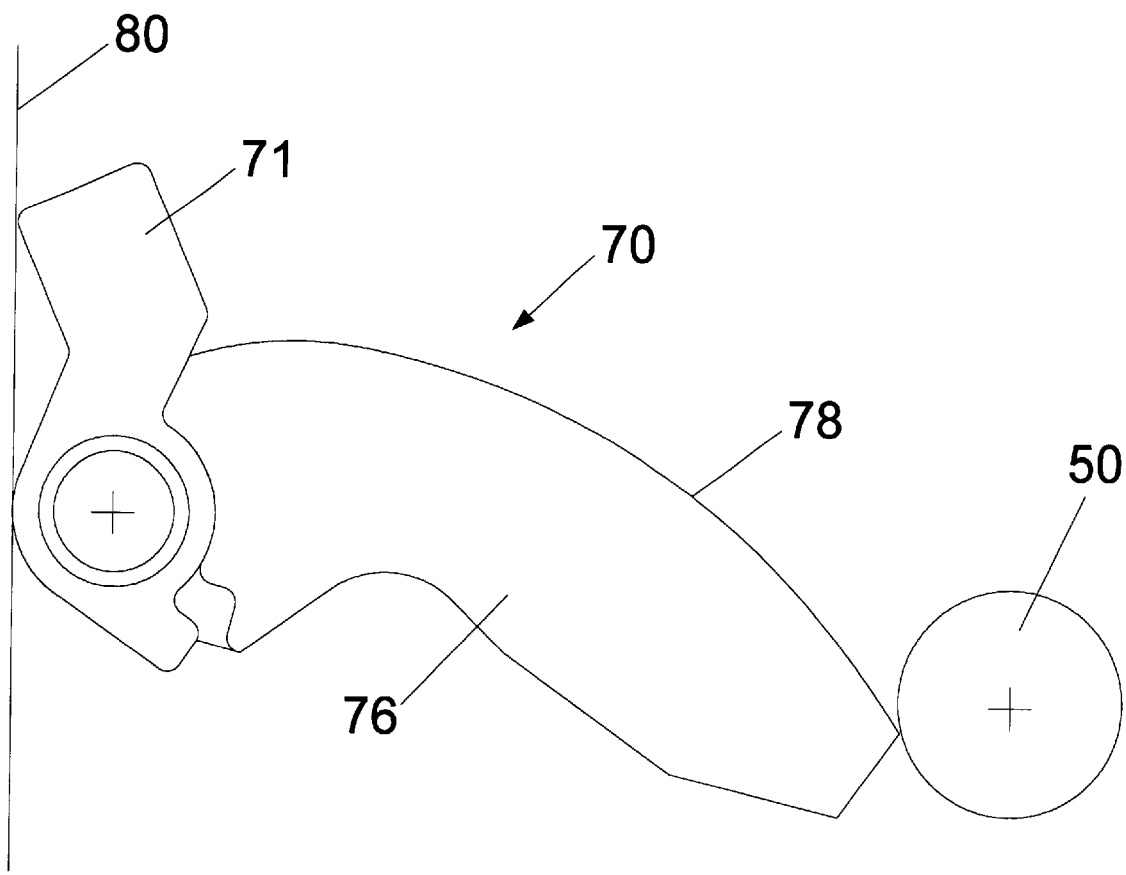

Shoulder-piece 71 is rotatably attached to alternate-flyweight 70 so that shoulder-piece 71 rotates with alternate-flyweight 70 until obstruction 80 prevents further rotation of shoulder-piece 71. Shoulder-piece 71 may be rotatably attached to alternate-flyweight 70 coaxially with the pivot. Where shoulder-piece 71 ceases to rotate may be adjusted independently of reference line 52 by adjusting where obstruction 80 is placed. The center of mass (COM) of shoulder-piece 71 preferably is positioned within a 60 degree wide sector centered at pivot's center and extending from 60 degrees from the plumb line to 120 degrees from the plumb line when alternate-flyweight 70 is at rest. At rest consists of the assembly being statically suspended from the pivot. Preferably, the COM of shoulder-piece 71 is more than 10 millimeters from the pivot's center. Preferably, obstruction 80 is selectively placed outside of the ambit of the flyweight such that obstruction 80 stops shoulder-piece 71 from further rotation with alternate-flyweight 70 before the COM of shoulder-piece 71 reaches reference line 52. However, obstruction 80 may be placed outside of the ambit of the flyweight such that shoulder-piece 71 ceases to rotate with alternate-flyweight 70 after the COM of shoulder-piece 71 has passed reference line 52. FIGS. 2D2 through 2D5 show an expected arrangement of the parts of this embodiment, and roller 50, as the shift ratio decreases from a large value to a small value.

The embodiment shown on FIG. 2D1 differs from the device disclosed in the Reese patent in ways that include: one arm-piece 76 versus two arms, parts that are in contact versus spaced apart, shoulder-piece 71 rotation is selectively stopped by obstruction 80 prior to (or alternatively after) reference line versus second arm must stop when its COM reaches the reference line, and no use of a pin is made.

Figures 1, 2E:
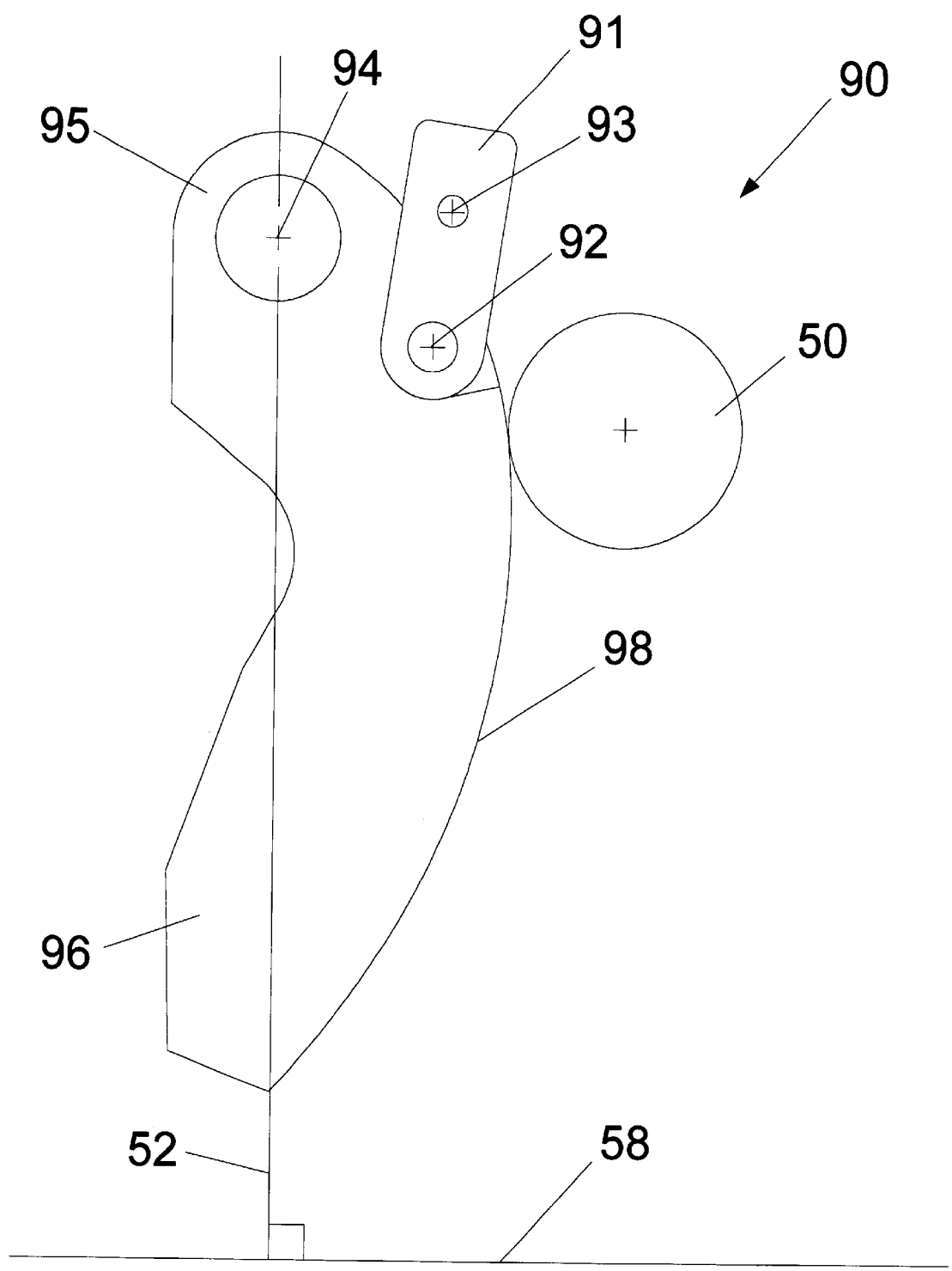
Figures 2, 2E:
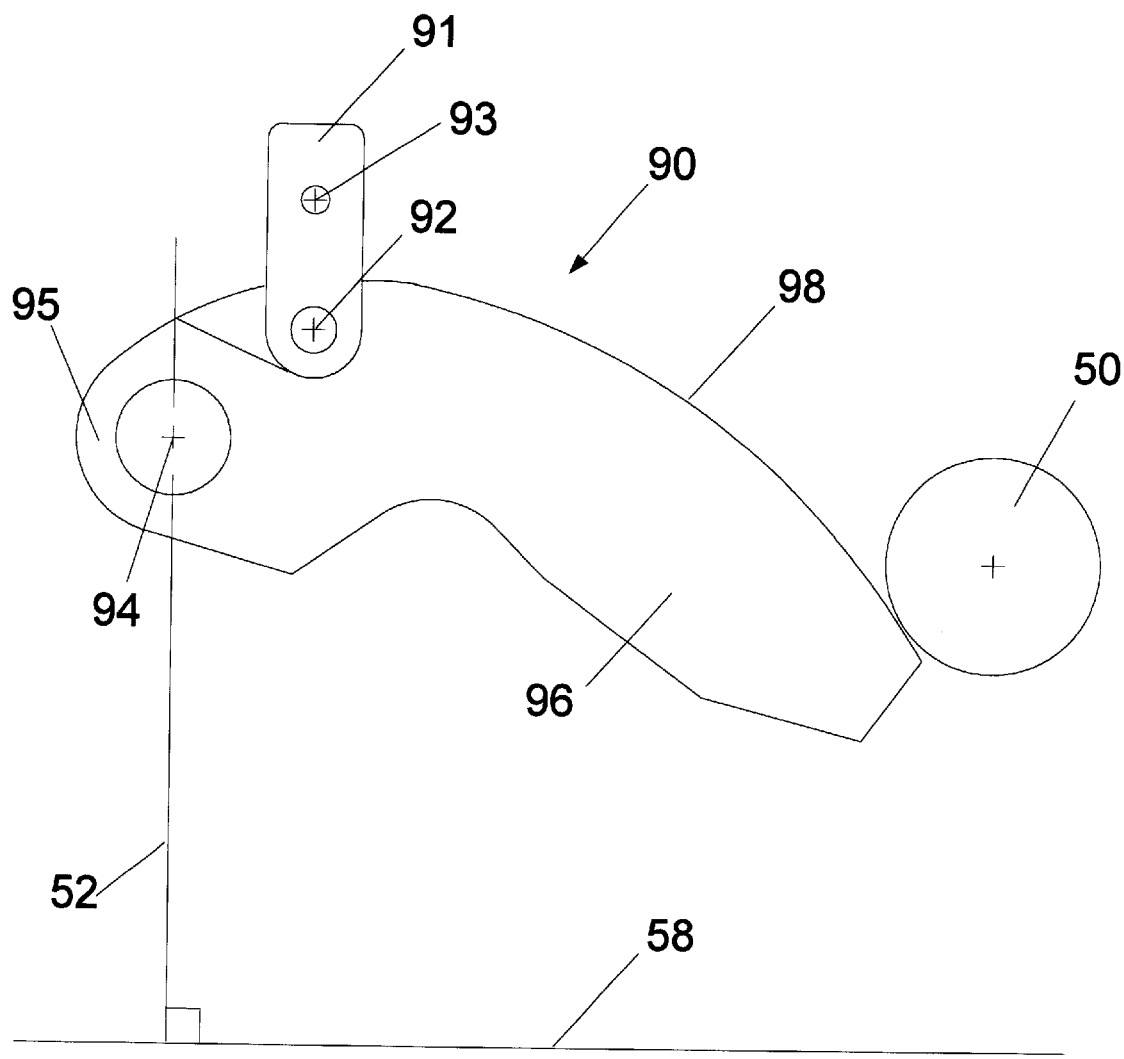

A further embodiment is shown on FIGS. 2E1 and 2E2 as flyweight 90. In this embodiment, shoulder 21 of the preferred embodiment is replaced by massive toggle shoulder 91 (with shoulder COM 93) that is attached to the vicinity of head 95 with secondary pivot 92. Flyweight 90 as a whole revolves about pivot 94 while toggle shoulder 91 toggles between at least two positions. Preferably, secondary pivot 92 is on flyweight 90 in the vicinity of head 95 with toggle shoulder 91 rotationally attached to secondary pivot 92 such that at rest, shoulder COM 93 is positioned within a 60 degree wide sector centered at the center of pivot 94 and extending from 60 degrees from the plumb line to 120 degrees from the plumb line and such that toggle shoulder 91 is capable of toggling between at least two positions. At rest consists of the assembly being statically suspended from pivot 94.

Figure 2F:
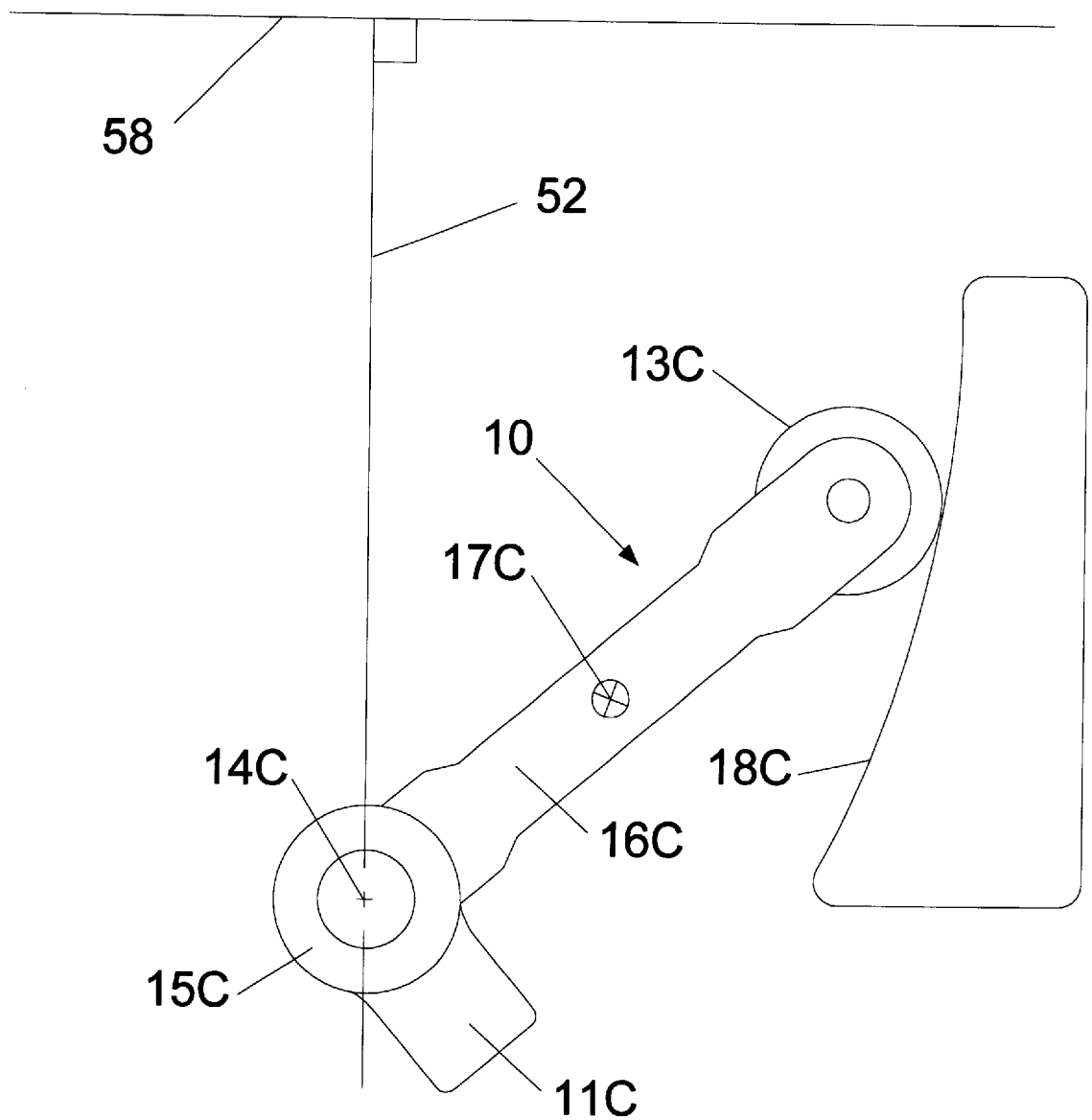
FIG. 2F is a side view of the flyweight of FIG. 1C supplemented with the shoulder of the preferred embodiment of the present invention.
Figure 3:
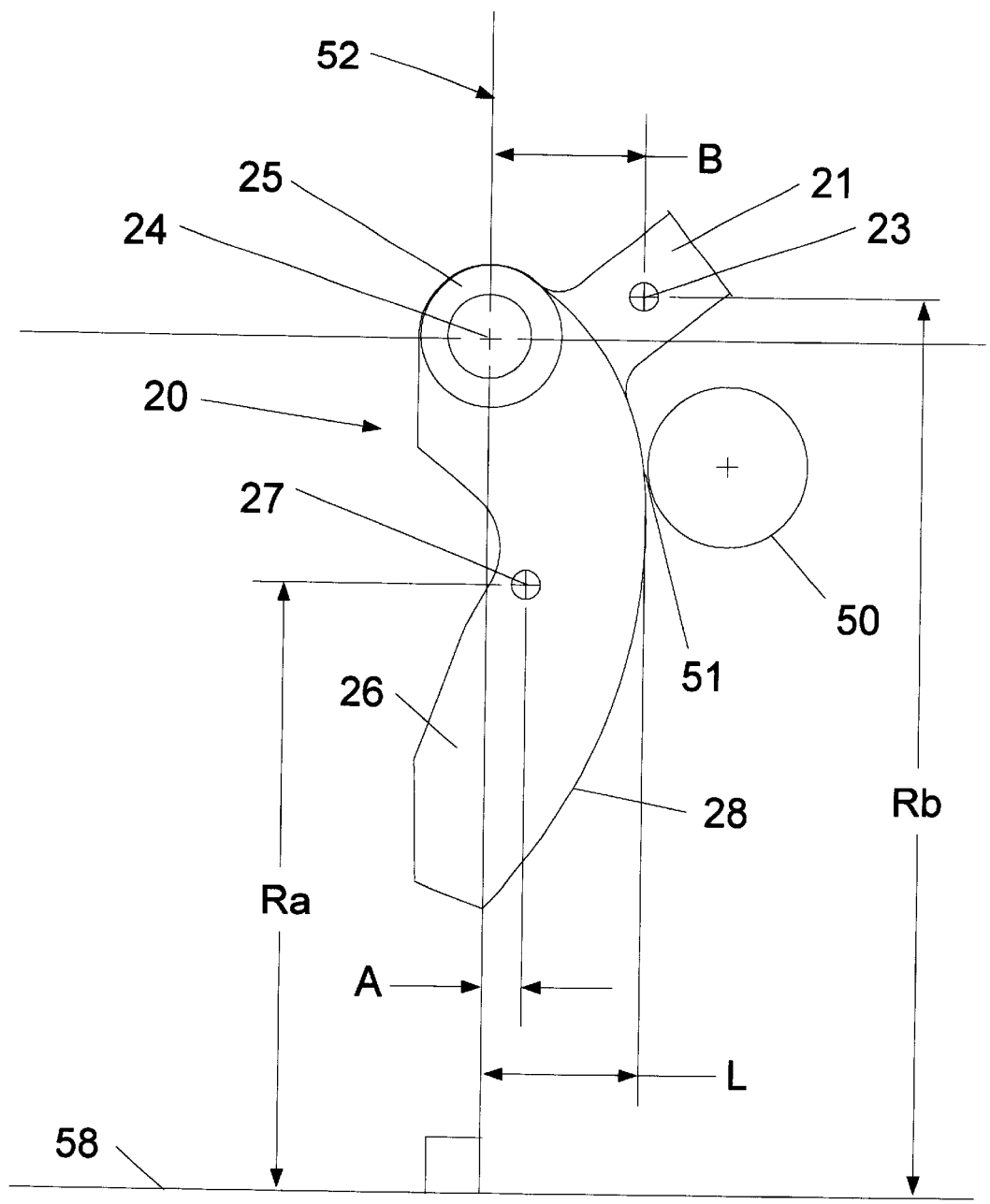
Figure 4:
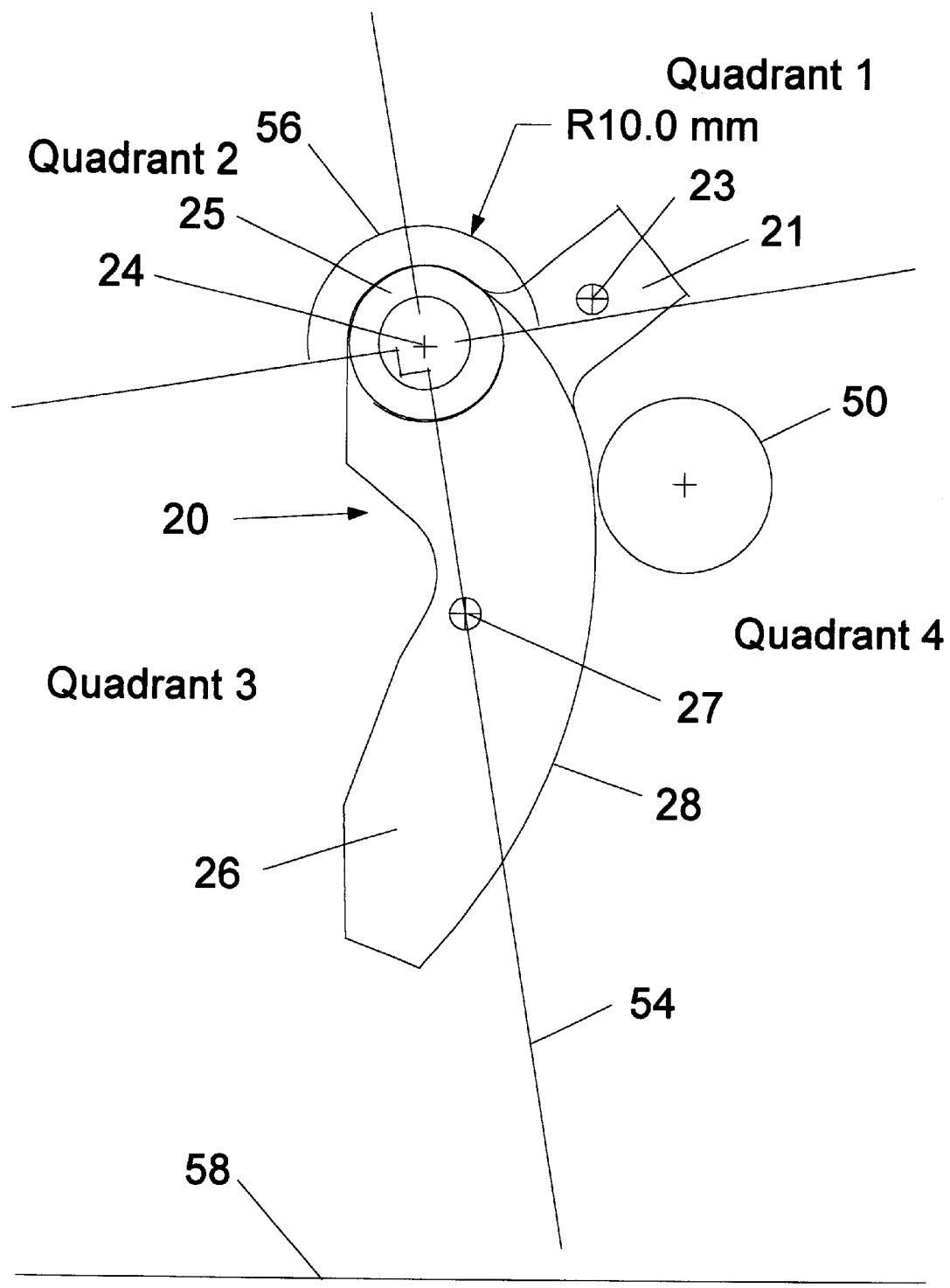
FIG. 4 is a side view of the preferred embodiment flyweight and roller whereon are marked: the plumb line, the four quadrants, and the 10 millimeter contour.
Figure 5:
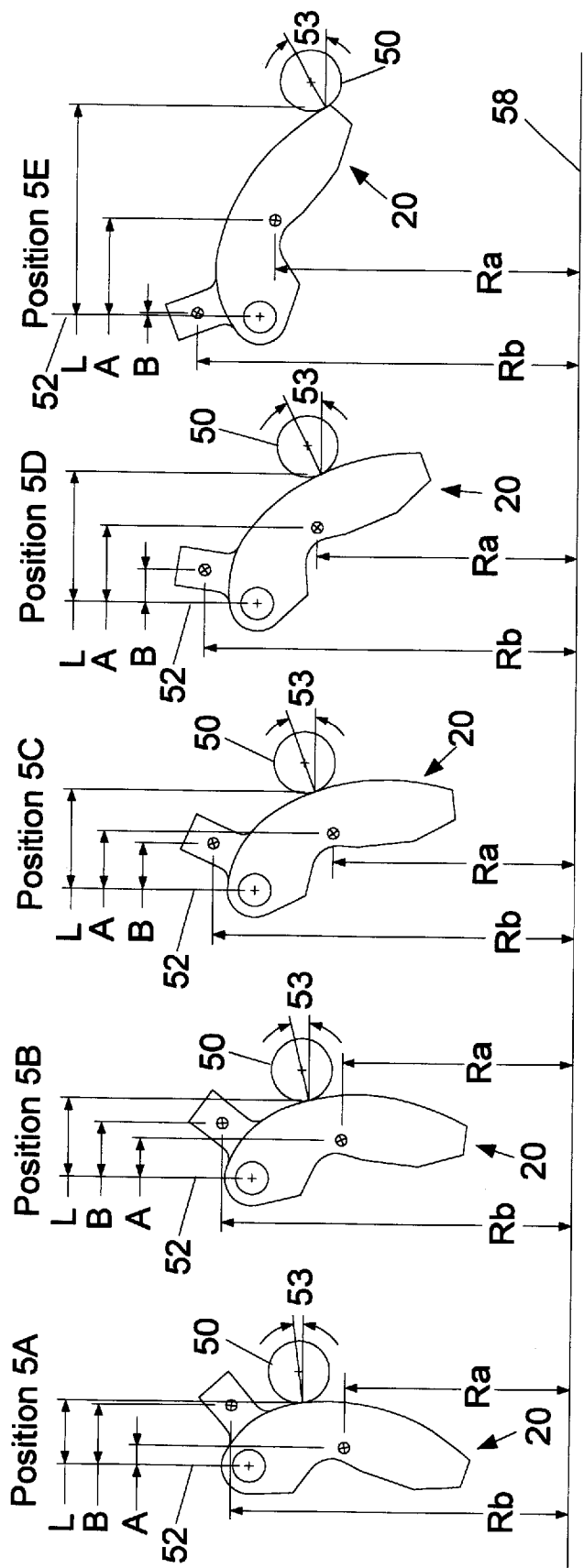
Figure 5A:
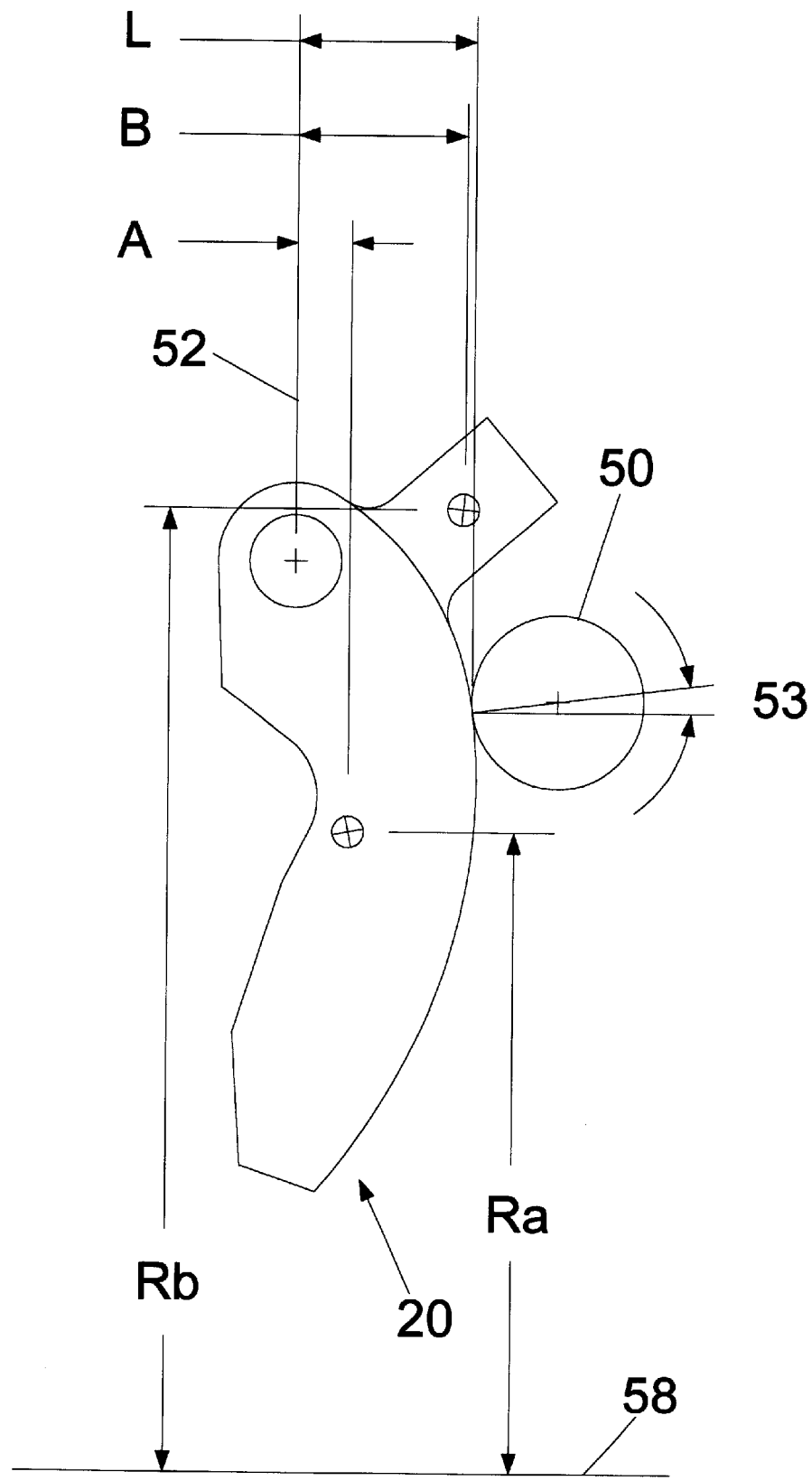
FIGS. 5A through 5E show larger views of five positions of the preferred embodiment and roller for a sequence of rotations of flyweight corresponding to decreasing shift ratio.
Figure 5B:
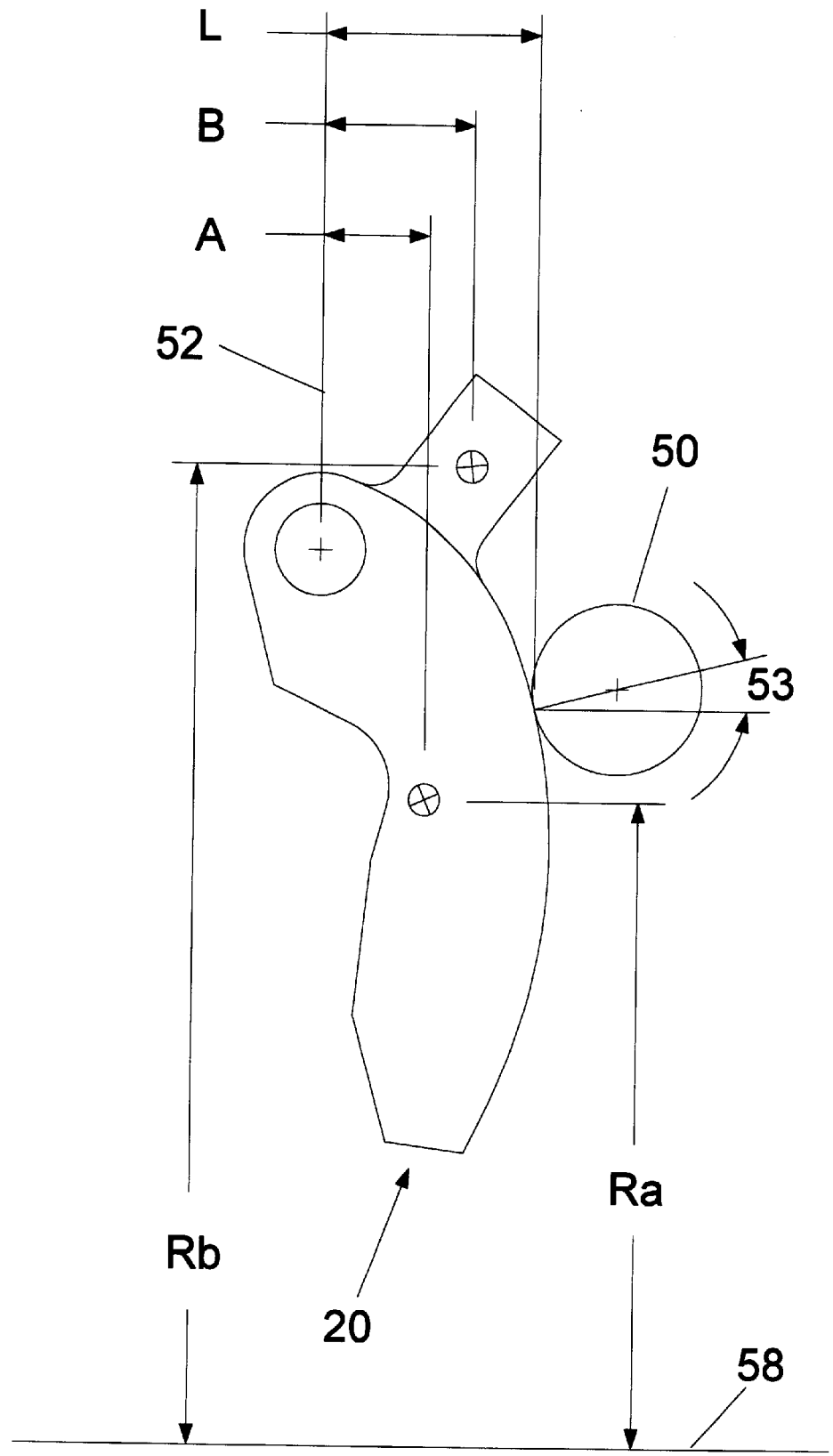
Figure 5C:
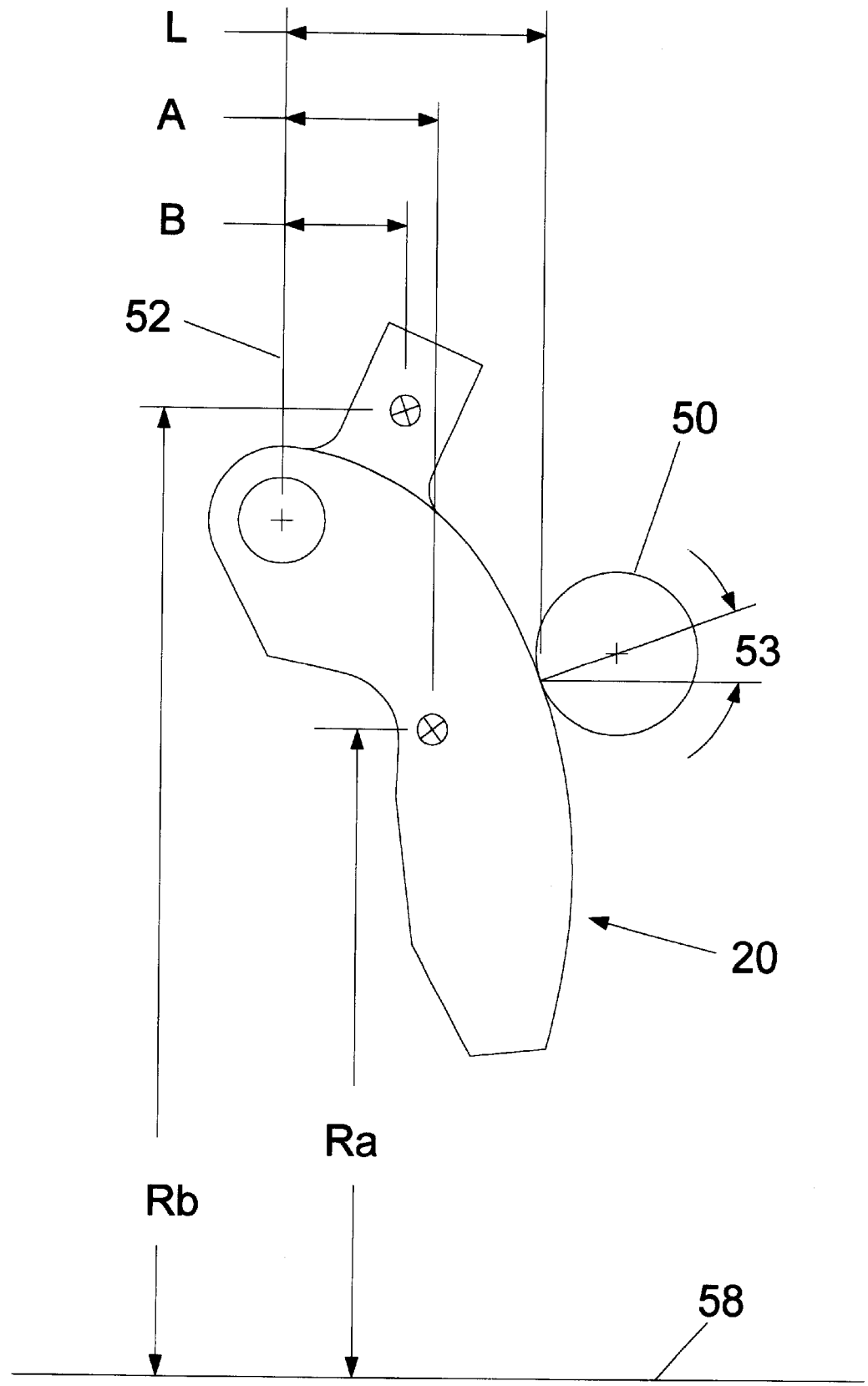
Figure 5D:
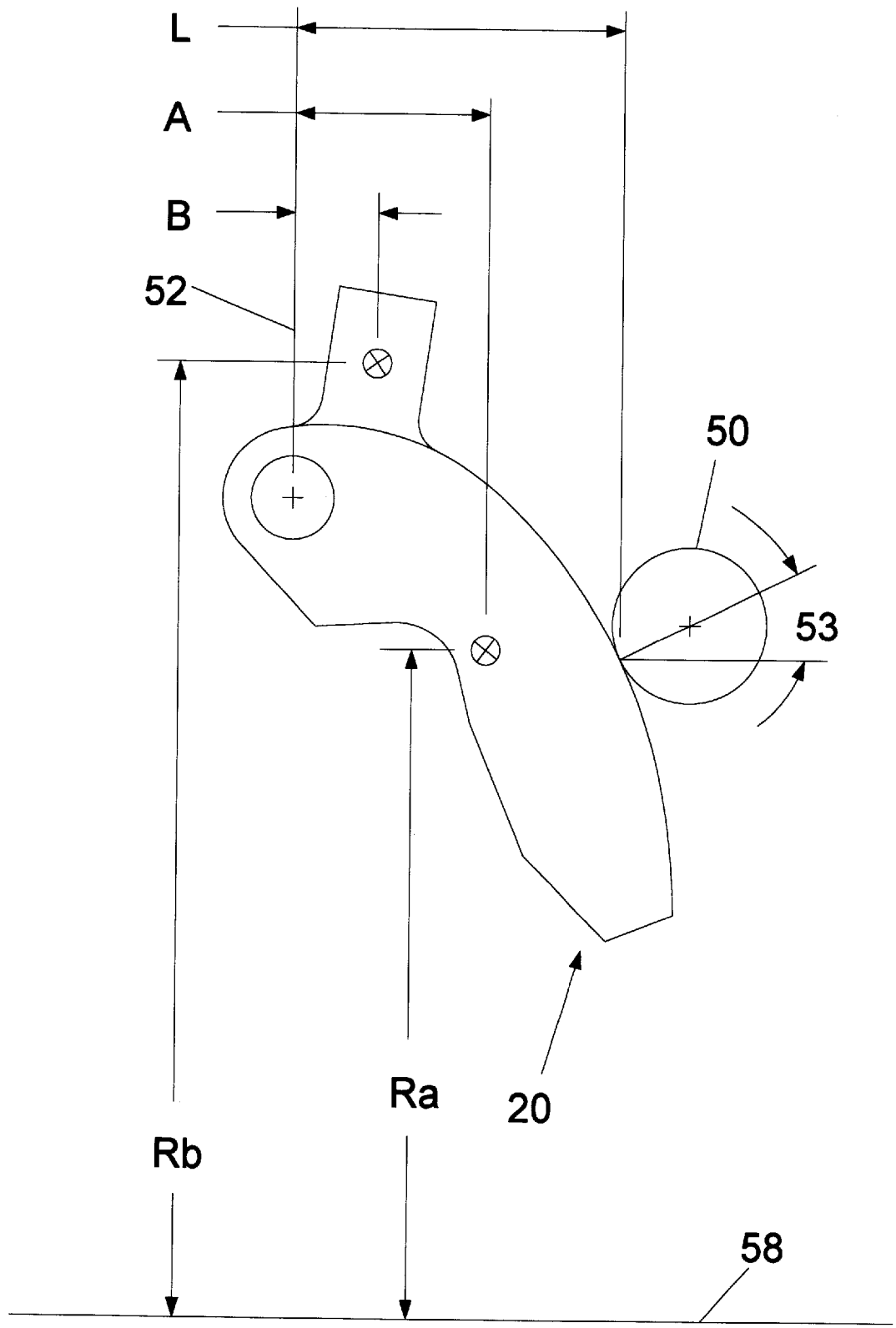
Figure 5E:
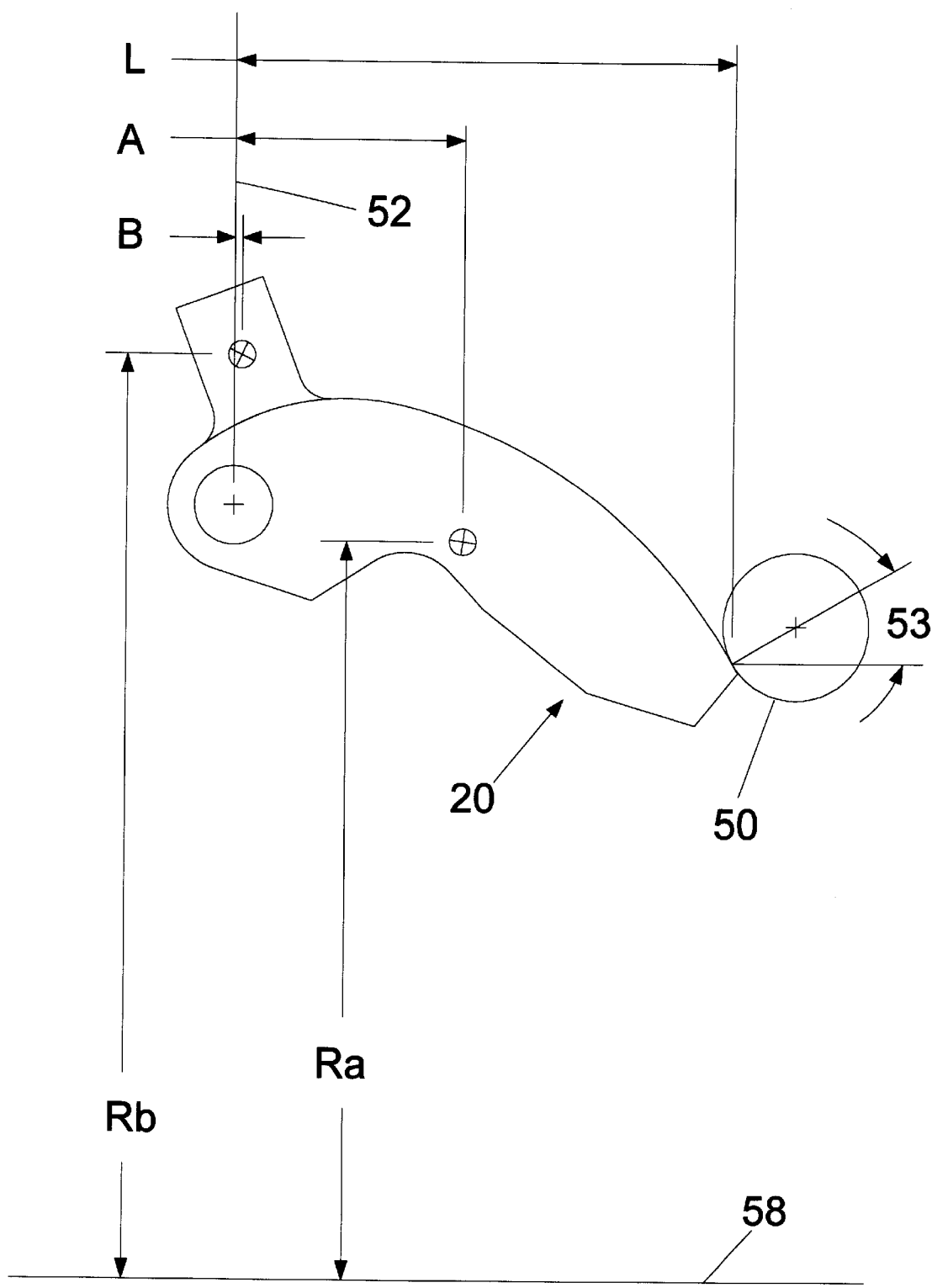

FIG. 2F shows how the present invention would be used to place the preferred massive shoulder on head 15C to effect Ski-Doo shoulder 11C. It is preferred to place the shoulder's COM within a 60 degree wide sector centered at the center of pivot 14C and extending from 60 degrees from the plumb line to 120 degrees from the plumb line.

The preferred embodiment and several alternate embodiments of the present invention have been described in detail. The embodiments described are illustrative and not restrictive. All of the embodiments accomplish the same desirable task in essentially the same way. Namely: improving a conventional flyweight's production of force (and thus, in the case of a CVT, side force) by novelly supplementing a flyweight with strategically placed mass concentrations.

We claim:

1. An improved flyweight for use in a CVT,
    the flyweight having
        a head symmetrically surrounding a pivot with a rotational axis passing through center of said pivot,
        an arm extending away from said pivot, having a cam surface, and having a center-of-mass (COM), and
        a plumb line dropped from said center of said pivot of said flyweight when said flyweight is statically suspended by said pivot, where angles measured from said plumb line start at zero degrees for directions along said plumb line in the direction of said arm and increase in the direction of said cam surface; and
        four quadrants, in a plane normal to said pivot axis, numbered from one to four increasing counterclockwise from a line segment normal to said plumb line and that extends from said pivot center on the side of said flyweight having said cam surface, with counterclockwise rotating from said line segment towards said head; and
    said flyweight being rotatably attached to the CVT by said pivot such that rotationally induced forces cause rotation of said cam surface so as to effect changes in the shift ratio of the CVT, where the improvement comprises:
        one or more mass concentrations supplementing said flyweight and having their COM more than 10 millimeters distant from said pivot center in said first and second quadrants.

2. An improved flyweight as recited in claim 1, wherein at least one of said mass concentrations consists of a massive shoulder supplementing said flyweight within said first quadrant.

3. An improved flyweight as recited in claim 2, wherein said shoulder includes an adaptation to receive supplemental masses.

4. An improved flyweight as recited in claim 3, wherein said adaptation comprises an orifice through said shoulder essentially parallel to said rotational axis.

5. An improved flyweight as recited in claim 3, wherein said adaptation comprises an orifice into said shoulder essentially normal to said rotational axis.

6. An improved flyweight for use in a CVT,
    the flyweight having
        a head symmetrically surrounding a pivot with a rotational axis passing through center of said pivot,
        an arm extending away from said pivot, having a cam surface, and having a center-of-mass (COM), and
        a plumb line dropped from said center of said pivot of said flyweight when said flyweight is statically suspended by said pivot, where angles measured from said plumb line start at zero degrees for directions along said plumb line in the direction of said arm and increase in the direction of said cam surface; and
        four quadrants, in a plane normal to said pivot axis, numbered from one to four increasing counterclockwise from a line segment normal to said plumb line and that extends from said pivot center on the side of said flyweight having said cam surface, with counterclockwise rotating from said line segment towards said head; and
    said flyweight being rotatably attached to the CVT by said pivot such that rotationally induced forces cause rotation of said cam surface so as to effect changes in the shift ratio of the CVT, where the improvement comprises:
        one or more mass concentrations supplementing said flyweight and having their COM more than 10 millimeters distant from said plumb line in said third quadrant.

7. An improved flyweight for use in a CVT,
    the flyweight having
        a head surrounding a pivot with a rotational axis passing through center of said pivot,
        an arm extending away from said pivot, having a cam surface, and having a center-of-mass (COM), and
        a plumb line dropped from said center of said pivot of said flyweight when said flyweight is statically suspended by said pivot, where angles measured from said plumb line start at zero degrees for directions along said plumb line in the direction of said arm and increase in the direction of said cam surface; and
        four quadrants, in a plane normal to said pivot axis, numbered from one to four increasing counterclockwise from a line segment normal to said plumb line and that extends from said pivot center on the side of said flyweight having said cam surface, with counterclockwise rotating from said line segment towards said head; and
    said flyweight being rotatably attached to the CVT by said pivot such that rotationally induced forces cause rotation of said cam surface so as to effect changes in the shift ratio of the CVT, where the improvement comprises:
        one or more mass concentrations supplementing said flyweight and having their COM more than 10 millimeters distant from said head and said arm.

8. An improved flyweight as recited in claim 7, wherein said mass concentrations are in said first and second quadrants.

9. An improved flyweight as recited in claim 7, wherein at least one of said mass concentrations consists of a massive shoulder supplementing said flyweight within said first quadrant.

10. An improved flyweight as recited in claim 9, wherein said shoulder includes an adaptation to receive supplemental masses.

11. An improved flyweight as recited in claim 10, wherein said adaptation comprises an orifice through said shoulder essentially parallel to said rotational axis.

12. An improved flyweight as recited in claim 10, wherein said adaptation comprises an orifice into said shoulder essentially normal to said rotational axis.

13. An improved flyweight for use in a CVT,
    the flyweight having
        a pivot with a center,
        an arm extending away from said pivot, said arm having a cam surface, and a plumb line dropped from said center of said pivot of said flyweight when said flyweight is statically suspended by said pivot where angles measured from said plumb line start at zero degrees for directions along said plumb line in the direction of said arm and increase in the direction of said cam surface;

said flyweight being rotatably attached to the CVT by said pivot such that rotationally induced forces cause rotation of said cam surface so as to effect changes in the shift ratio of the CVT, where the improvement comprises:

a massive shoulder attached to said flyweight, where said shoulder has a COM that is positioned within a 60 degree wide sector centered at said pivot's center and extending from 60 degrees from said plumb line to 120 degrees from said plumb line.

14. An improved flyweight as recited in claim 13 wherein said shoulder's COM is more than ten millimeters from said pivot center.

15. An improved flyweight for use in a CVT, the flyweight having a head symmetrically surrounding a pivot with a rotational axis passing through center of said pivot, an arm extending away from said pivot, having a cam surface, and having a center-of-mass (COM), and a plumb line dropped from said center of said pivot of said flyweight when said flyweight is statically suspended by said pivot where angles measured from said plumb line start at zero degrees for directions along said plumb line in the direction of said arm and increase in the direction of said cam surface; and four quadrants, in a plane normal to said pivot axis, numbered from one to four increasing counterclockwise from a line segment normal to said plumb line and that extends from said pivot center on the side of said flyweight having said cam surface, with counterclockwise rotating from'said line segment towards said head; and said flyweight being rotatably attached to the CVT by said pivot such that rotationally induced forces cause rotation of said cam surface so as to effect changes in the shift ratio of the CVT, where the improvement comprises:

one or more mass concentrations, each having a COM, supplementing said flyweight wherein at least one of said supplementing mass concentrations has its COM within said fourth quadrant positioned such that said COM rotates into said first quadrant during operational rotation of said flyweight.

16. An improved flyweight as recited in claim 15, wherein at least one of said supplemental mass concentrations within said fourth quadrant is more than 10 millimeters from said plumb line.

17. An improved flyweight for use in a CVT, the CVT having a fixed cam surface; and the flyweight having a pivot with a center, an arm extending away from said pivot, said arm having a roller at its distal end engaging said cam surface, and a plumb line dropped from said center of said pivot of said flyweight when said flyweight is statically suspended by said pivot where angles measured from said plumb line start at zero degrees for directions along said plumb line in the direction of said arm and increase in the direction of said cam surface;

said flyweight being rotatably attached to the CVT by said pivot such that rotationally induced forces cause rotation of said arm and said cam-surface-engaging roller so as to effect changes in the shift ratio of the CVT, where the improvement comprises:

a massive shoulder attached to said flyweight, where said shoulder has a COM that is positioned within a 60 degree wide sector centered at said pivot's center and extending from 60 degrees from said plumb line to 120 degrees from said plumb line.

18. A method of improving CVTs that use conventional flyweights where said flyweights have a pivot with a rotational axis passing through center of said pivot, an arm extending away from said pivot, said arm having a cam surface, a plumb line dropped from said center of said pivot of said flyweight when said flyweight is statically suspended by said pivot where angles measured from said plumb line start at zero degrees for directions along said plumb line in the direction of said arm and increase in the direction of said cam surface; and where said flyweight is rotatably attached to the CVT by said pivot such that rotationally induced forces cause rotation of said cam surface so as to effect changes in the shift ratio of the CVT, comprising the step of:

attaching a massive shoulder to at least one of said flyweights, where said shoulder has a COM that is positioned within a 60 degree wide sector centered at said pivot's center and extending from 60 degrees from said plumb line to 120 degrees from said plumb line.

19. A method, as recited in claim 18, further comprising the step of:

adapting said massive shoulder so that said shoulder may receive supplemental masses.

20. A method, as recited in claim 19, wherein said adapting step is effected by placing an orifice through said shoulder essentially parallel to said rotational axis.

21. A method, as recited in claim 19, wherein said adapting step is effected by placing an orifice through said shoulder essentially normal to said rotational axis.

22. A method, as recited in claim 18, further comprising the step of:

providing an adjustable spring means for partially opposing the effects of the rotation of the rotating flyweights.

* * * * *